United States Patent
Kobayashi et al.

(10) Patent No.: US 8,561,467 B2
(45) Date of Patent: Oct. 22, 2013

(54) ANGULAR VELOCITY SENSOR ELEMENT, ANGULAR VELOCITY SENSOR AND ANGULAR VELOCITY SENSOR UNIT BOTH USING ANGULAR VELOCITY SENSOR ELEMENT, AND SIGNAL DETECTING METHOD FOR ANGULAR VELOCITY SENSOR UNIT

(75) Inventors: Yasunobu Kobayashi, Fukui (JP); Takashi Kawai, Fukui (JP); Tomohiro Mitani, Fukui (JP); Youhei Ashimori, Fukui (JP)

(73) Assignee: Panasonic Corporation, Osaka (JP)

( * ) Notice: Subject to any disclaimer, the term of this patent is extended or adjusted under 35 U.S.C. 154(b) by 278 days.

(21) Appl. No.: 13/122,445

(22) PCT Filed: Oct. 6, 2009

(86) PCT No.: PCT/JP2009/005177
§ 371 (c)(1),
(2), (4) Date: Apr. 4, 2011

(87) PCT Pub. No.: WO2010/041422
PCT Pub. Date: Apr. 15, 2010

(65) Prior Publication Data
US 2011/0179869 A1    Jul. 28, 2011

(30) Foreign Application Priority Data

| Oct. 7, 2008 | (JP) | 2008-260525 |
|---|---|---|
| Jan. 22, 2009 | (JP) | 2009-011533 |
| Sep. 14, 2009 | (JP) | 2009-211401 |

(51) Int. Cl.
*G01C 19/56* (2012.01)

(52) U.S. Cl.
USPC .................................... 73/504.12; 73/504.16

(58) Field of Classification Search
USPC ............... 73/504.12, 504.16, 504.04, 504.15
See application file for complete search history.

(56) References Cited

U.S. PATENT DOCUMENTS

| 6,267,008 | B1 * | 7/2001 | Nagao ........................ 73/504.12 |
|---|---|---|---|
| 6,520,015 | B1 * | 2/2003 | Alause et al. .................. 73/497 |
| 7,412,885 | B2 * | 8/2008 | Ogura ........................ 73/504.12 |
| 7,533,568 | B2 * | 5/2009 | Murakami ................ 73/504.16 |
| 7,975,545 | B2 * | 7/2011 | Noguchi et al. ........... 73/504.12 |
| 8,117,913 | B2 * | 2/2012 | Terada ....................... 73/504.12 |
| 8,122,766 | B2 * | 2/2012 | Aizawa et al. ............. 73/504.12 |
| 2009/0064783 | A1 * | 3/2009 | Ohuchi et al. ............. 73/514.15 |
| 2010/0218604 | A1 * | 9/2010 | Terada ....................... 73/504.12 |
| 2011/0283796 | A1 * | 11/2011 | Ohuchi et al. ............. 73/514.35 |

FOREIGN PATENT DOCUMENTS

| EP | 2 063 224 | 5/2009 |
|---|---|---|
| JP | 2000-074676 | 3/2000 |
| JP | 2001-264067 | 9/2001 |
| JP | 2003-510592 | 3/2003 |
| JP | 2003-337025 | 11/2003 |
| JP | 2006-275878 | 10/2006 |
| WO | 2007/086337 | 8/2007 |
| WO | 2008/023566 | 2/2008 |

* cited by examiner

*Primary Examiner* — Helen Kwok
(74) *Attorney, Agent, or Firm* — Wenderoth, Lind & Ponack, L.L.P.

(57) ABSTRACT

The angular velocity sensor of the present invention has one end connected to holding section and the other end connected to weighting section. According to the angular velocity sensor, driving arm has a dog-leg structure of arms extending in a direction perpendicular to a connecting direction of holding section and weighting section.

21 Claims, 17 Drawing Sheets

FIG. 1
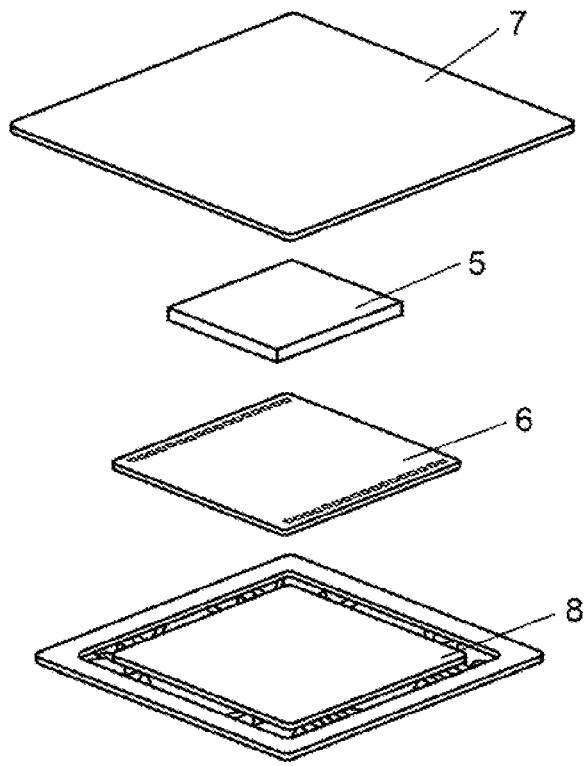
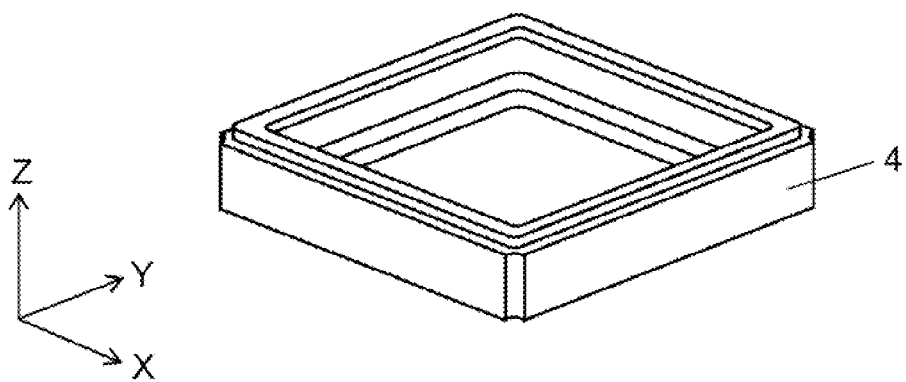

t=0.1

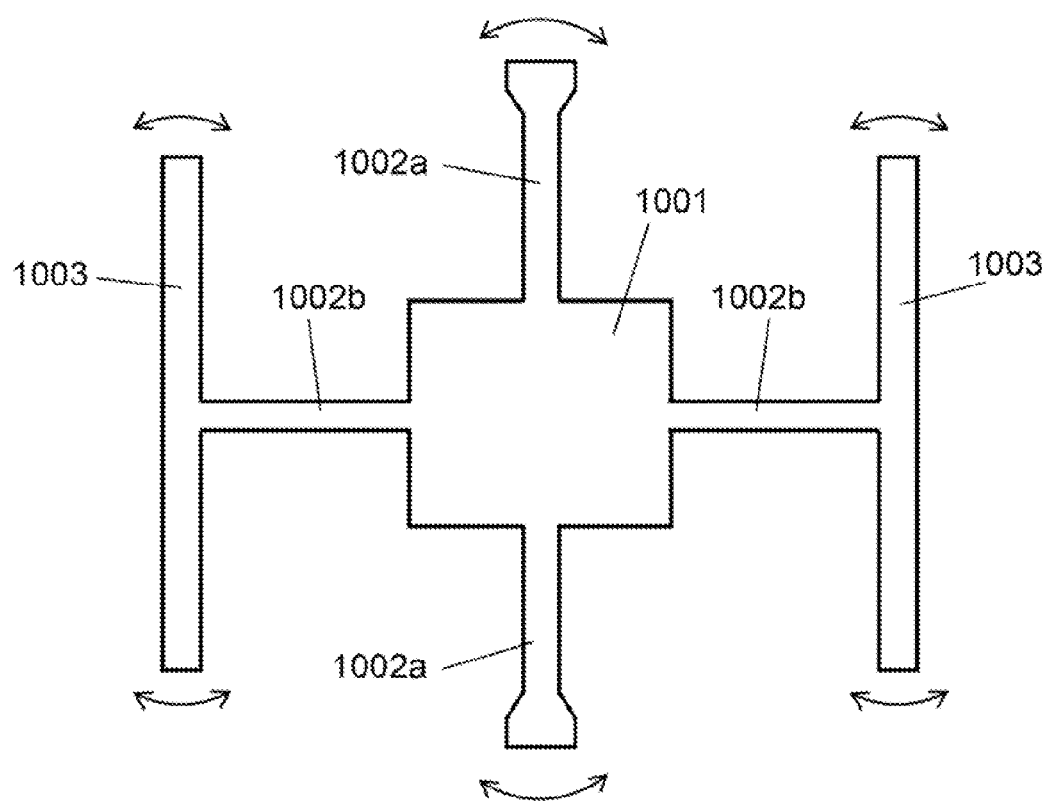
FIG. 23 – PRIOR ART

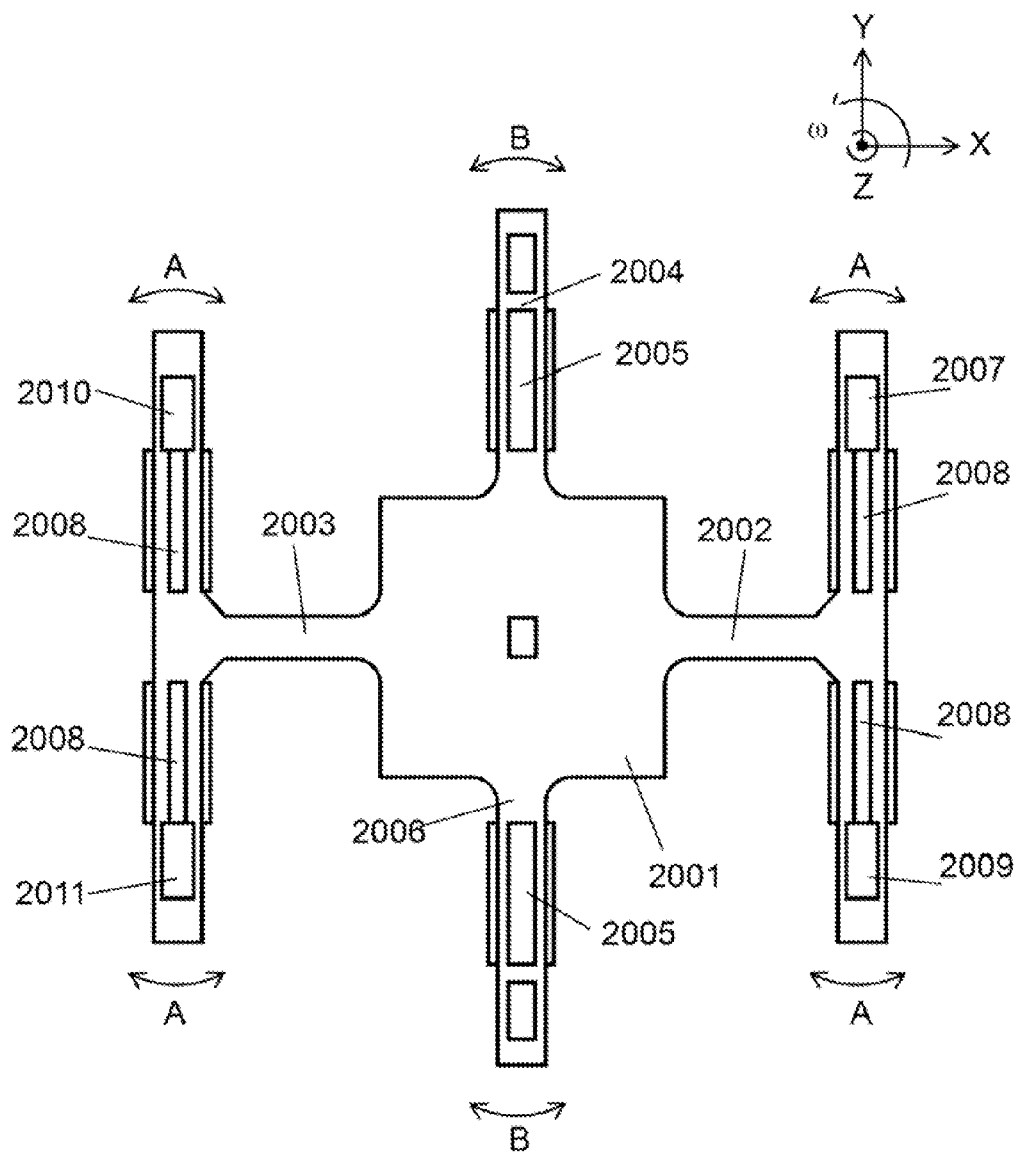
FIG. 24 – PRIOR ART

ANGULAR VELOCITY SENSOR ELEMENT, ANGULAR VELOCITY SENSOR AND ANGULAR VELOCITY SENSOR UNIT BOTH USING ANGULAR VELOCITY SENSOR ELEMENT, AND SIGNAL DETECTING METHOD FOR ANGULAR VELOCITY SENSOR UNIT

This application is a U.S. national phase application of International Application PCT/JP2009/005177, filed Oct. 6, 2009.

BACKGROUND OF THE INVENTION

I. Technical Field

The present invention relates to an angular velocity sensor element used for electronic equipment, an angular velocity sensor having the element, and an angular velocity sensor unit. It also relates to a method of detecting a signal of the angular velocity sensor element.

II. Description of the Related Art

FIG. 23 is a top view showing a conventional angular velocity sensor element. In FIG. 23, a pair of arms 1002a and a pair of arms 1002b extend in a crosswise direction from holding section 1001 as the center. In each pair, the arms are symmetrically disposed. The pair of arms 1002a is detecting arm 1002a, whereas the pair of arms 1002b is supporting arm 1002b. Driving arm 1003 is disposed on the tip of supporting arm 1002b. When driving arm 1003 is vibrated in the directions indicated by the arrows, angular velocity is produced and the Coriolis force is exerted on driving arm 1003. The Coriolis force accompanies a stress that is exerted on supporting arm 1002b and then transmitted to detecting arm 1002a, by which detecting arm 1002a vibrates in the directions indicated by the arrows. The vibration causes a deflection in detecting arm 1002a and the deflection is electrically converted into an output signal. The angular velocity sensor element described above is disclosed, for example, in Japanese Unexamined Patent Application Publication No. 2003-337025.

However, the aforementioned angular velocity sensor element has a cantilever structure where the center part of driving arm 1003 is fixed to supporting arm 1002b. In the structure above, vibration velocity greatly differs between the tip of driving arm 1003 and the tip of supporting arm 1002b fixed to the center of driving arm 1003 as the base point of vibration. The Coriolis force occurs in proportion to the vibration velocity. It is therefore difficult to obtain the Coriolis force at around the base point of vibration of driving arm 1003, resulting in poor stress to be transmitted to detecting arm 1002a.

FIG. 24 is a top view showing another structure of a conventional angular velocity sensor element. In FIG. 24, crystal-made holding section 2001 of a square shape has first arm 2002 and second arm 2003 extending in an X-axis direction. First detecting electrode vibrating body 2004 is made of crystal. One end of vibrating body 2004 is connected to holding section 2001 and the other end extends in a Y-axis direction. First detecting electrode vibrating body 2004 has four outside surfaces and each of which has detecting electrode 2005 thereon. Besides; holding section 2001 has second detecting electrode vibrating body 2006 in the Y-axis direction on the opposite side of first detecting electrode vibrating body 2004. Similarly, second detecting electrode vibrating body 2006 has four outside surfaces and each of which has detecting electrode 2005 thereon.

First driving electrode vibrating body 2007 is made of crystal. One end of vibrating body 2007 is connected to first arm 2002 and the other end extends in the Y-axis direction. First driving electrode vibrating body 2007 has four outside surfaces and each of which has detecting electrode 2008 thereon.

Second driving electrode vibrating body 2009 is made of crystal. One end of vibrating body 2009 is connected to first arm 2002 and the other end extends in the Y-axis direction on the opposite side of first driving electrode vibrating body 2007. Second driving electrode vibrating body 2009 has four outside surfaces and each of which has detecting electrode 2008 thereon.

Third driving electrode vibrating body 2010 is made of crystal. One end of vibrating body 2010 is connected to second arm 2003 and the other end extends in the Y-axis direction. Third driving electrode vibrating body 2010 has four outside surfaces and each of which has detecting electrode 2008 thereon.

Fourth driving electrode vibrating body 2011 is made of crystal. One end of vibrating body 2011 is connected to second arm 2003 and the other end extends in the Y-axis direction on the opposite side of third driving electrode vibrating body 2010. Fourth driving electrode vibrating body 2011 has four outside surfaces and each of which has detecting electrode 2008 thereon.

The conventional angular velocity sensor element has the structure described above. Next, the workings of the sensor element will be described.

When AC voltage is applied to each driving electrode 2008 of first driving electrode vibrating body 2007, second driving electrode vibrating body 2009, third driving electrode vibrating body 2010, and fourth driving electrode vibrating body 2011, the aforementioned four vibrating bodies vibrate in a driving direction at velocity V. When the angular velocity sensor element is rotated, at angular velocity $\omega$, on a Z-axis that is perpendicular to the plane on which the angular velocity sensor element is disposed, first driving electrode vibrating body 2007, second driving electrode vibrating body 2009, third driving electrode vibrating body 2010, and fourth driving electrode vibrating body 2011 undergo Coriolis force F ($=2mv\times\omega$). Transmitting the Coriolis force, via first arm 2002, second arm 2003 and holding section 2001, to first detecting electrode vibrating body 2004 and second detecting electrode vibrating body 2006 allows each detecting electrode 2005 to output an output signal corresponding to angular velocity. Such structured sensor element is disclosed, for example, in Japanese Unexamined Patent Application Publication No. 2001-264067.

See also Japanese Unexamined Patent Application Publication No. 2006-275878.

In the conventional structure above, however, each one end of first driving electrode vibrating body 2007 and second driving electrode vibrating body 2009 is fixed to first arm 2002; similarly, each one end of third driving electrode vibrating body 2010 and fourth driving electrode vibrating body 2011 is fixed to second arm 2003. Therefore, the vibration of the sensor element is peculiar to that of a cantilever structure. Compared to the fixed ends of the four vibrating bodies above, each free end of them has less amount of displacement, and accordingly, a small amount of Coriolis force. As a result, the angular velocity sensor element has low sensibility of output.

SUMMARY OF THE INVENTION

The present invention provides an angular velocity sensor element with improvement in detection level and increase in output sensibility. Besides, the present invention suppresses degradation of detection accuracy of an angular velocity sensor unit.

The structure of the angular velocity sensor element of the present invention has the following features:
- a holding section is connected with a weighting section by a driving arm;
- the driving arm has a driving electrode for vibrating the weighting section in the connected direction of the holding section and the weighting section and a detecting electrode for detecting angular velocity exerted on the driving arm; and
- the driving arm has a dog-leg structure of arm members extending in a direction perpendicular to the vibrating direction of the weighting section.

With the structure above, the angular velocity sensor element of the present invention has an improvement in detection level.

Besides, the structure of the present invention has a holding section, a detecting electrode vibrating body, a driving electrode vibrating body, and a weighting section. Having a square-pole shape, the detecting electrode vibrating body has at least one detecting electrode disposed on an edge side of the top surface of the square pole and a GND electrode disposed on a side surface of the square pole. One end of the detecting electrode vibrating body is connected to the holding section and the other end is connected to the driving electrode vibrating body. Having a square-pole shape, the driving electrode vibrating body has a pair of driving electrodes disposed on at least two surfaces of the four surfaces of the square pole. One end of the driving electrode vibrating body is connected to the detecting electrode vibrating body and the other end is connected to the weighting section. In addition, a bend is disposed at the joint between the detecting electrode vibrating body and the driving electrode vibrating body.

According to the structure above, the bend—disposed at the joint the detecting electrode vibrating body and the driving electrode vibrating body—works as a fulcrum point and allows both the vibrating bodies to have large deflection. This increases the Coriolis force occurred in the detecting electrode vibrating body, thereby increasing the level of the output signals from the detecting electrode of the detecting electrode vibrating body. As a result, the angular velocity sensor element enhances the output sensibility.

As an aspect of the present invention, an angular velocity sensor unit has a vibration sensor element for detecting angular velocity and a package containing an IC for controlling the sensor element. In the sensor element, a driving electrode, a monitoring electrode, and a sensing electrode are disposed on the driving arm. On the supporting arm that supports the driving arm, a correction electrode is disposed at a wiring electrode of a monitoring electrode. The correction electrode forms a correction signal caused by Z-axis vibration. That is, an unwanted signal formed in the monitoring electrode due to the Z-axis vibration is attenuated by the correction signal. The structure suppresses degradation of detection accuracy of the angular velocity sensor unit.

BRIEF DESCRIPTION OF THE DRAWINGS

FIG. 1 is an exploded perspective view showing an angular velocity sensor in accordance with a first exemplary embodiment of the present invention.

FIG. 23 is a top view showing a conventional angular velocity sensor element.

FIG. 24 is a top view showing another structure of a conventional angular velocity sensor element.

DETAILED DESCRIPTION OF THE INVENTION

Hereinafter, the structure of the first exemplary embodiment will be described with reference to the accompanying drawings.

FIG. 1 is an exploded perspective view showing an angular velocity sensor in accordance with the first exemplary embodiment of the present invention. In FIG. 1, package 4 contains angular velocity sensor element 5 and ASIC 6. ASIC 6 has a driving control circuit that applies a driving signal to angular velocity sensor element 5 and a detecting circuit that processes a detecting signal fed from sensor element 5. The opening of package 4 is covered with lid 7. ASIC 6 and angular velocity sensor element 5 are disposed in package 4 via TAB tape for the purpose of anti-vibration.

Figure 2:
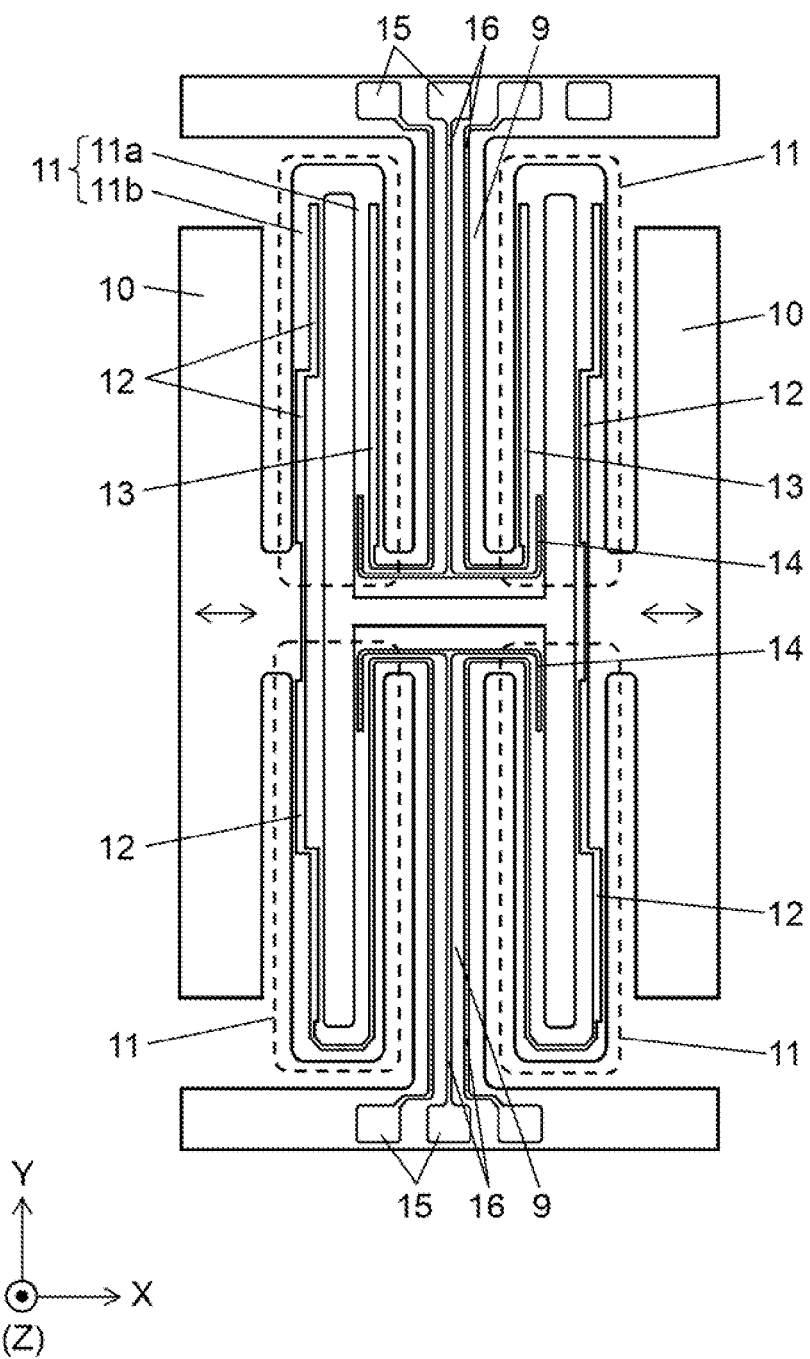
FIG. 2 is a top view showing the angular velocity sensor in accordance with the first exemplary embodiment of the present invention.

FIG. 2 is a top view showing the angular velocity sensor in accordance with the first exemplary embodiment of the present invention. Angular velocity sensor element 5 of FIG. 2 has holding section 9, weighting sections 10 symmetrically disposed on the both sides of holding section 9, and a pair of driving arms 11 connecting each of weighting sections 10. Driving arms 11 have driving electrode 12, detecting electrode 13, and monitoring electrode 14, which will be described later. Electrodes 12, 13, and 14 are connected to pad electrode 15 via connecting wire 16. Each of driving arms 11 has a dog-leg structure of arm 11a and arm 11b extending in a direction (i.e., in a Y-axis direction) perpendicular to the connecting direction of holding section 9 and weighting sections 10 (i.e., in an X-axis direction). Each of the driving arms has a first end near the holding section and a second end near the weighting section. The length of the driving arm from the first end to the second end in a first direction (e.g., X direction in FIG. 2) is shorter than a length of the driving arm in a second direction (e.g. Y direction in FIG. 2), the second direction being substantially perpendicular to the first direction.

Figure 3:
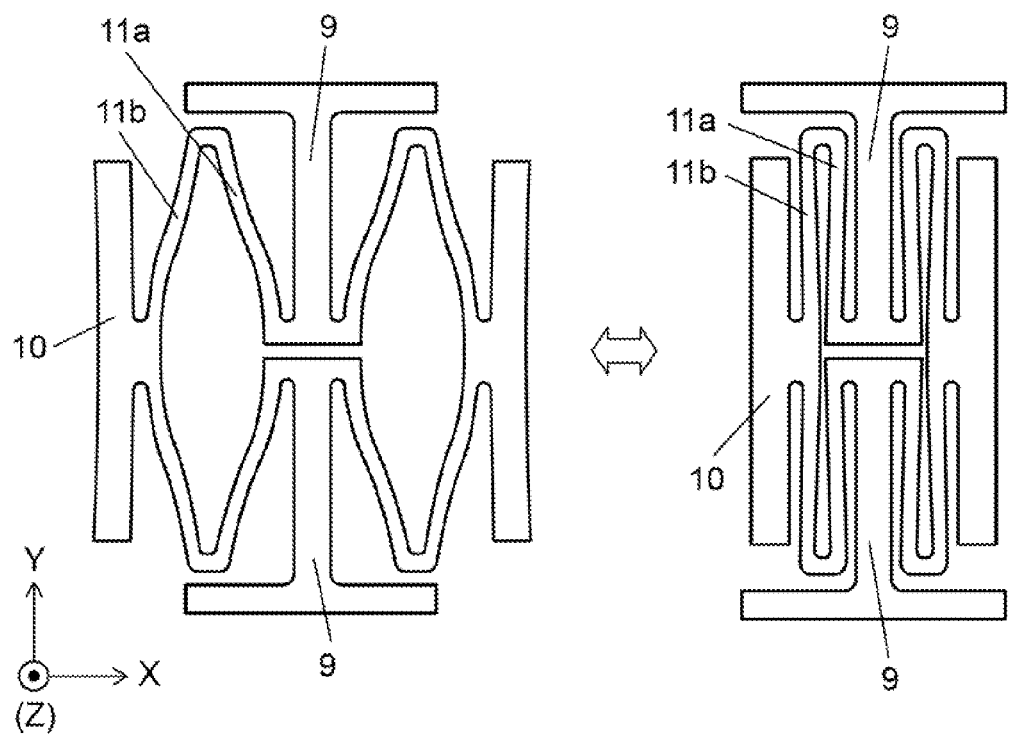
FIG. 3 schematically shows a driving vibration state of an angular velocity sensor element in accordance with the first exemplary embodiment of the present invention.
Figure 4:
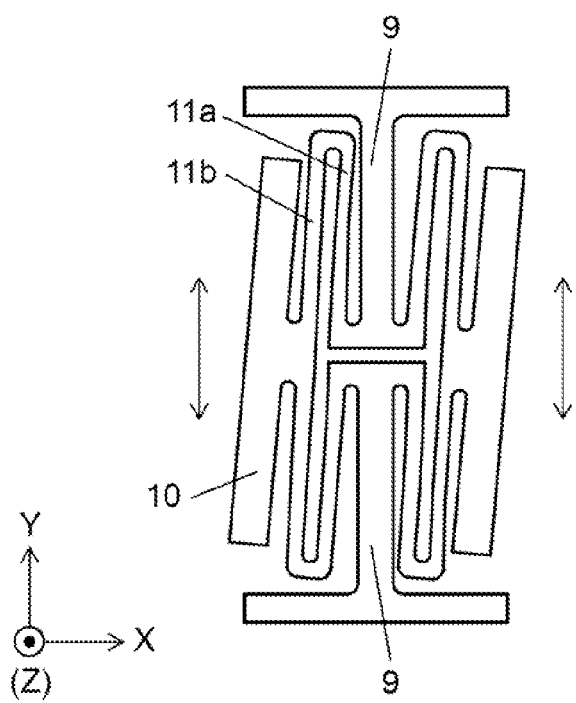
FIG. 4 schematically shows a detecting vibration state of the angular velocity sensor element in accordance with the first exemplary embodiment of the present invention.

FIG. 3 schematically shows a driving vibration state of an angular velocity sensor element in accordance with the first exemplary embodiment of the present invention. FIG. 4 schematically shows a detecting vibration state of the angular velocity sensor element in accordance with the first exemplary embodiment of the present invention. Applying a driving signal, which is generated in ASIC 6, to driving electrode 12 via pad electrode 15 and connecting wire 16 allows weighting sections 10 to have vibration with compression and extension in the X-axis direction. In the driving vibration state, the substrate surface (i.e. the X-Y plane) of angular velocity sensor element 5 undergoes angular velocity with a rotation axis along a Z-axis direction (that is perpendicular to the X-Y plane), by which the Coriolis force is produced. The Coriolis force allows driving arms 11 to vibrate in the Y-axis direction, as shown in FIG. 4.

Detecting electrode 13 (shown in FIG. 2) detects deflection of driving arms 11 caused by the detecting vibration and converts it into an electric signal as a detecting signal. The detecting signal is transmitted to ASIC 6 via connecting wire 16 and pad electrode 15. Monitoring electrode 14 controls detection accuracy of the sensor element; specifically, it detects vibration amplitude and a driving cycle of driving arms 11 in vibration and feeds the information back to ASIC 6.

Figure 5:
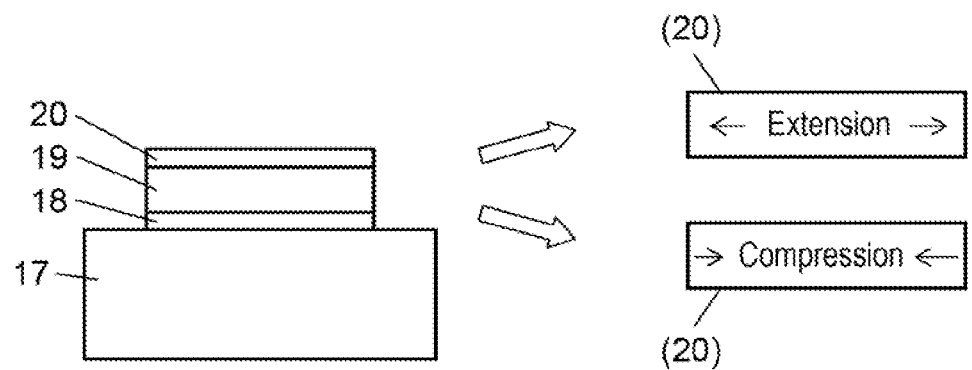
FIG. 5 schematically shows compression/extension mechanism of an electrode disposed on the angular velocity sensor element in accordance with the first exemplary embodiment of the present invention.

FIG. 5 schematically shows compression/extension mechanism of an electrode disposed on the angular velocity sensor element in accordance with the first exemplary embodiment of the present invention. Angular velocity sensor element 5 has driving electrode 12, detecting electrode 13, and monitoring electrode 14 on the substrate made of Si. The electrode of FIG. 5 has a laminated structure formed of Pt-made lower electrode 18 disposed on substrate 17, PZT-made piezoelectric layer 19 disposed on lower electrode 18, and Au-made upper electrode 20 disposed on piezoelectric layer 19. When a positive voltage is applied to upper electrode 20 while lower electrode 18 is being grounded, the laminated electrode undergoes a compression force in the laminated direction. As the compression force is exerted on the laminated structure with lower electrode 18 fixed to substrate 17, the laminated electrode has an extension along the surface direction of substrate 17. When a negative voltage is applied to upper electrode 20, the laminated electrode undergoes a tensile force in the laminated direction. As the tensile force is exerted on the laminated structure with lower electrode 18 fixed to substrate 17, the laminated electrode has a compression along the surface direction of substrate 17. Conversely, providing driving arms 11 with deflection can produce voltage. That is, a negative voltage is obtained by exerting a compression force on the electrode, whereas a positive voltage is obtained by exerting a tensile force on the electrode. To enhance adhesion strength in the laminated structure, a Ti-made adhesion layer (not shown) is disposed between upper electrode 20 and piezoelectric layer 19 and between piezoelectric layer 19 and lower electrode 18.

Figure 6:
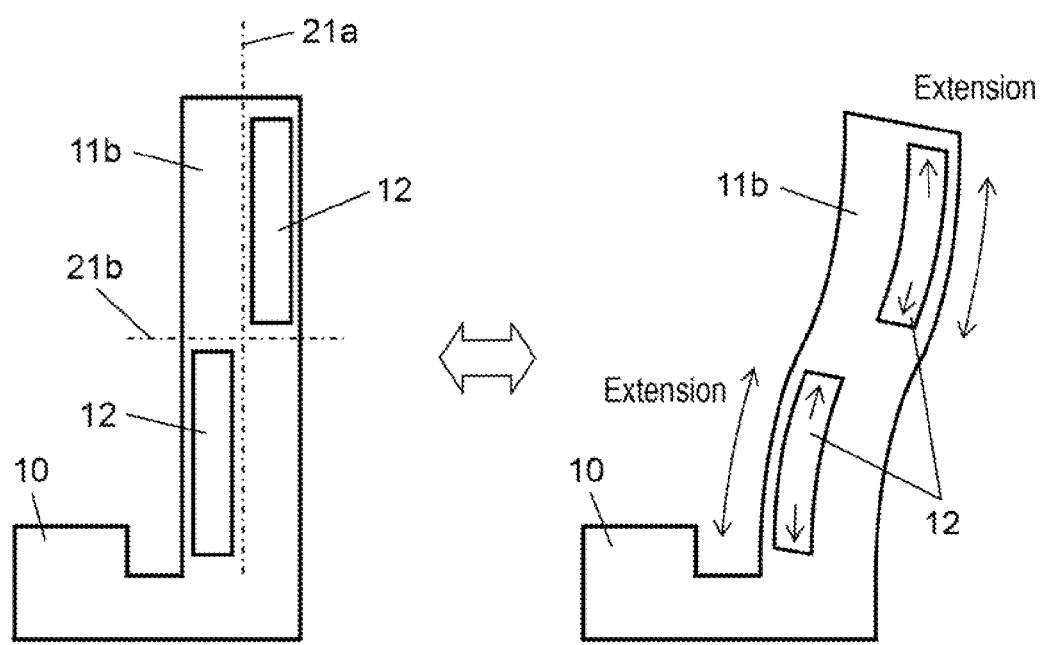
FIG. 6 schematically shows driving mechanism of the angular velocity sensor element in accordance with the first exemplary embodiment of the present invention.

FIG. 6 schematically shows driving mechanism of the angular velocity sensor element in accordance with the first exemplary embodiment of the present invention. Angular velocity sensor element 5 is driven as follows. First, as shown in FIG. 6, arm 11b connected on the side of weighting section 10 is divided into four areas on the vertical axis shown by broken line 21a and on the horizontal axis shown by broken line 21b (where, vertical axis 21a extends in the extending direction of arm 11b, and horizontal axis 21b is perpendicular to the extending direction of arm 11b so as to include a changing point of the deflection). Driving electrodes 12 are disposed in an area close to weighting section 10 and in the area diagonal to above. Driving signals with the same electric potential are applied to the driving electrodes. When a positive voltage is applied to the electrodes, a compression force is exerted on the electrodes, allowing the electrodes to have extension. As a result, arm 11b has a deflection of an S shape. When a negative voltage is applied to the electrodes, a tensile stress is exerted on the electrodes, allowing the electrodes to have compression. As a result, arm 11b has a deflection of an inverted S shape. Repeating the application of voltage allows weighting section 10 to have driving vibration.

According to the sensor element of the embodiment, driving arms 11 have a dog-leg structure of arm 11a and arm 11b extending perpendicular to the vibrating direction of weighting section 10. Besides, the deflection of arm 11a and 11b provides driving arms 11 with proper amplitude. With the structure above, driving arms 11 have amplitude larger than that of driving arm 1003, which has a conventional cantilever structure shown in FIG. 23. At the same time, arms 11a and 11b extend in a direction perpendicular to the vibrating direction of weighting section 10, which allows arms 11a and 11b to uniformly vibrate as a whole structure. Compared to a conventional structure where vibration velocity largely differs at a free end and a fixed end of the arms, driving arms 11 have a small difference in vibration velocity, undergoing a large Coriolis force. This enhances the detection level of angular velocity sensor element 5.

As described above, in the driving vibration state of weighting section 10, the sensor element undergoes angular velocity with a rotation axis (i.e. Z-axis) perpendicular to the vibration plane (i.e. the X-Y plane), by which the Coriolis force is produced. The Coriolis force allows driving arms 11 to have detecting vibration. Detecting electrode 13 detects deflection occurred in arm 11a caused by the detecting vibration, and converts it into an electric signal and outputs the signal to the detecting circuit of ASIC 6. Besides, when angular velocity sensor element 5 is accommodated in package 4, the mounting surface of package 4 is leveled with the substrate surface of angular velocity sensor element 5, and sensor element 5 has a detection axis of angular velocity so as to be perpendicular to the mounting surface. Like the structure of a conventional angular velocity sensor, the structure of the embodiment has a low-profile structure in a direction of the mounting surface.

Figure 7:
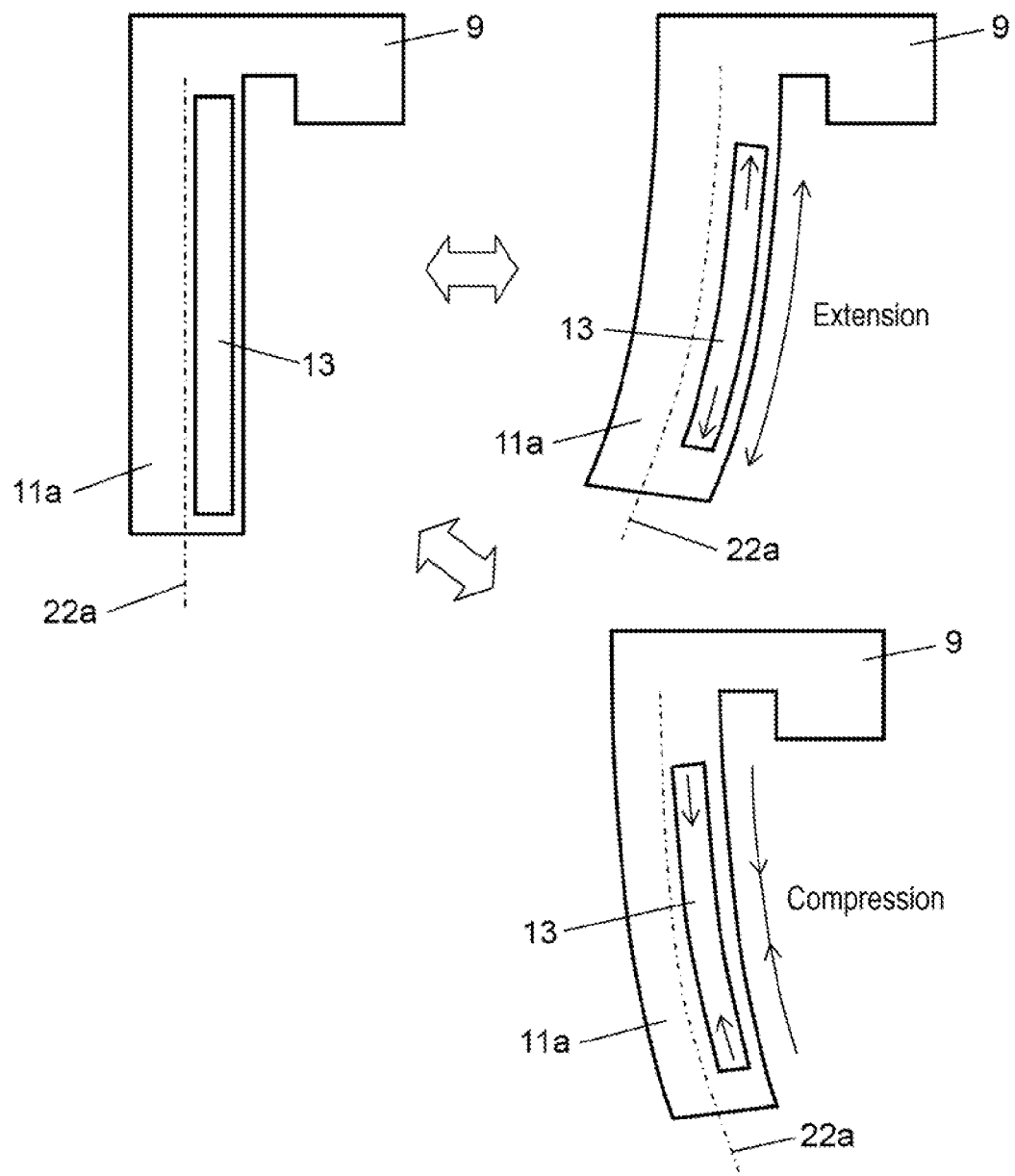
FIG. 7 schematically shows detecting mechanism of the angular velocity sensor element in accordance with the first exemplary embodiment of the present invention.

FIG. 7 schematically shows detecting mechanism of the angular velocity sensor element in accordance with the first exemplary embodiment of the present invention. As is shown in FIG. 7, detecting electrode 13 is offset from central axis 22a of arm 11a in the extending direction. Such positioned detecting electrode 13 effectively converts a deflection component of arm 11a into an electric signal. In this way, angular velocity sensor element 5 forms a detecting signal from the detecting vibration shown in FIG. 4.

As shown in FIG. 4, application of angular velocity allows arm 11a of driving arms 11 to have an arched shape. Detecting a deflection of the arched arm 11a, detecting electrode 13 generates a detecting signal corresponding to the deflection. FIG. 7 shows that detecting electrode 13 is disposed on arm 11a so as to be offset rightward from central axis 22a. When arm 11a has a leftward deflection as seen in FIG. 7, the right half of arm 11a undergoes a force that extends detecting electrode 13, so that positive voltage is produced. Conversely, when arm 11a has a rightward deflection as seen in FIG. 7, the right half of arm 11a undergoes a force that compresses detecting electrode 13, so that negative voltage is produced. Detecting electrode 13 thus produces a detecting signal.

When arm 11a is deflected into an arched shape, one half of arm 11a divided by central axis 22a undergoes a force that extends the electrode, whereas the other half undergoes a force that compresses the electrode. Suppose that detecting electrode 13 is positioned on arm 11a so as to have a width equally extended from central axis 22a on the both sides thereof. In the patterning, the negative voltage generated from a compression force exerted on the left half and the positive voltage generated from a tensile force exerted on the right half are cancelled each other in detecting electrode 13, by which detecting electrode 13 outputs no detecting signal.

Considering above, detecting electrode 13 should preferably be disposed in an offset arrangement so as not to extend across central axis 22a. This allows detecting electrode 13 to decrease the cancel-out effect, increasing the output level of detecting signal.

Figure 8:
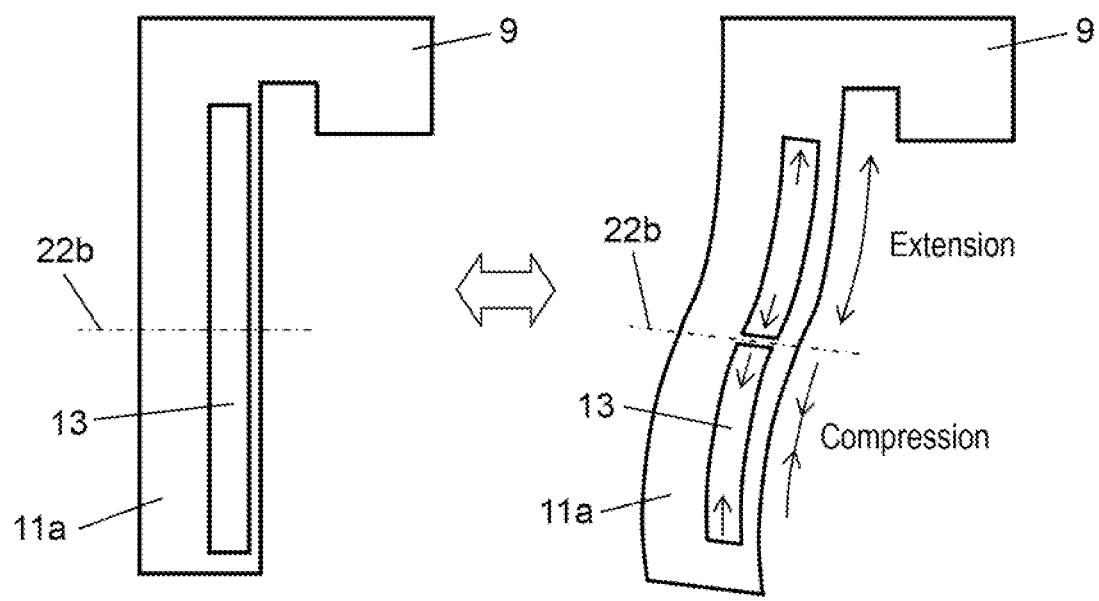
FIG. 8 schematically shows noise reduction mechanism of a detecting electrode in the driving vibration state of the angular velocity sensor element in accordance with the first exemplary embodiment of the present invention.

FIG. 8 schematically shows noise reduction mechanism of a detecting electrode in the driving vibration state of the angular velocity sensor element in accordance with the first exemplary embodiment of the present invention. Under the state with no application of angular velocity, that is, the state of driving vibration, detecting electrode 13 has no output signal; a signal fed from electrode 13 in the state is noise. To avoid the output of a noise signal, detecting electrodes 13 are disposed in the extending direction of arm 11a so as to be symmetrical with respect to changing point 22b, as shown in FIG. 8. Such an arrangement cancels out a signal generated in detecting electrode 13 in response to an S-shape deflection of the arm in the driving vibration. According to the structure, when arm 11a has an S-shape deflection in driving vibration, the stress on arm 11a is differently exerted on one half and the other half of detecting electrode 13 divided by changing point 22b; one is a compressive stress and the other is a tensile stress. By virtue of the symmetrical shape of the electrode, a positive voltage generated in detecting electrode 13 on one side and a negative voltage generated in electrode 13 on the other side are equivalent. This suppresses an unwanted signal caused by an S-shape deflection in driving vibration, enhancing detection accuracy of the angular velocity sensor element.

Driving electrode 12 should preferably be disposed on arm 11b, not on arm 11a having detecting electrode 13. If driving electrode 12 is located close to detecting electrode 13, a driving signal to be applied to driving electrode 12 inconveniently affects monitoring electrode 13, by which an unwanted noise signal is formed.

Driving arm 11 has a dogleg structure of arm 11a and arm 11b. Stability of vibrating direction cannot be expected by a single driving arm for a single weighting section. To address the problem, in the structure of the embodiment, the driving arms in pairs of a symmetric shape are disposed between the weighting sections. The structure enhances directional stability of vibration. Similarly, symmetrical arrangement of driving electrodes 12 on driving arms 11 contributes to enhanced directional stability of driving vibration.

Besides, in the structure where driving arms 11 in pairs are disposed between weighting section 10 as shown in FIG. 2, the wiring path of wiring electrode 16 connected to driving electrodes 12 can be separated from the wiring path of wiring electrode 16 connected to detecting electrode 13. The wiring is effective in decreasing unwanted connection between the driving signal path containing driving electrode 12 and the detecting signal path containing detecting electrode 13, enhancing detecting accuracy of the angular velocity sensor element.

Forming detecting electrode 13 on arm 11a on the side of holding section 9 shortens the output path of detecting signals, which further decreases noise generated in the output path. Further, Forming driving electrode 12 on arm 11b on the side of weighting section 10 increases the distance between detecting electrode 13 and driving electrode 12, which further decreases unwanted connection between the electrodes.

According to angular velocity sensor element 5 of the embodiment, a pair of driving arms 11 connecting between each weighting section 10 is supported by separated holding section 9. Separating the supporting part of driving arms 11 allows a pair of driving arms 11 connected to weighting section 10 to have a both end support structure in a macroscopic point of view. The structure further enhances flexibility of the connected part between driving arm 11 and holding section 9, increasing amplitude in the detecting vibration. As a result, the detection level of angular velocity sensor element 5 is further enhanced.

Figure 9:
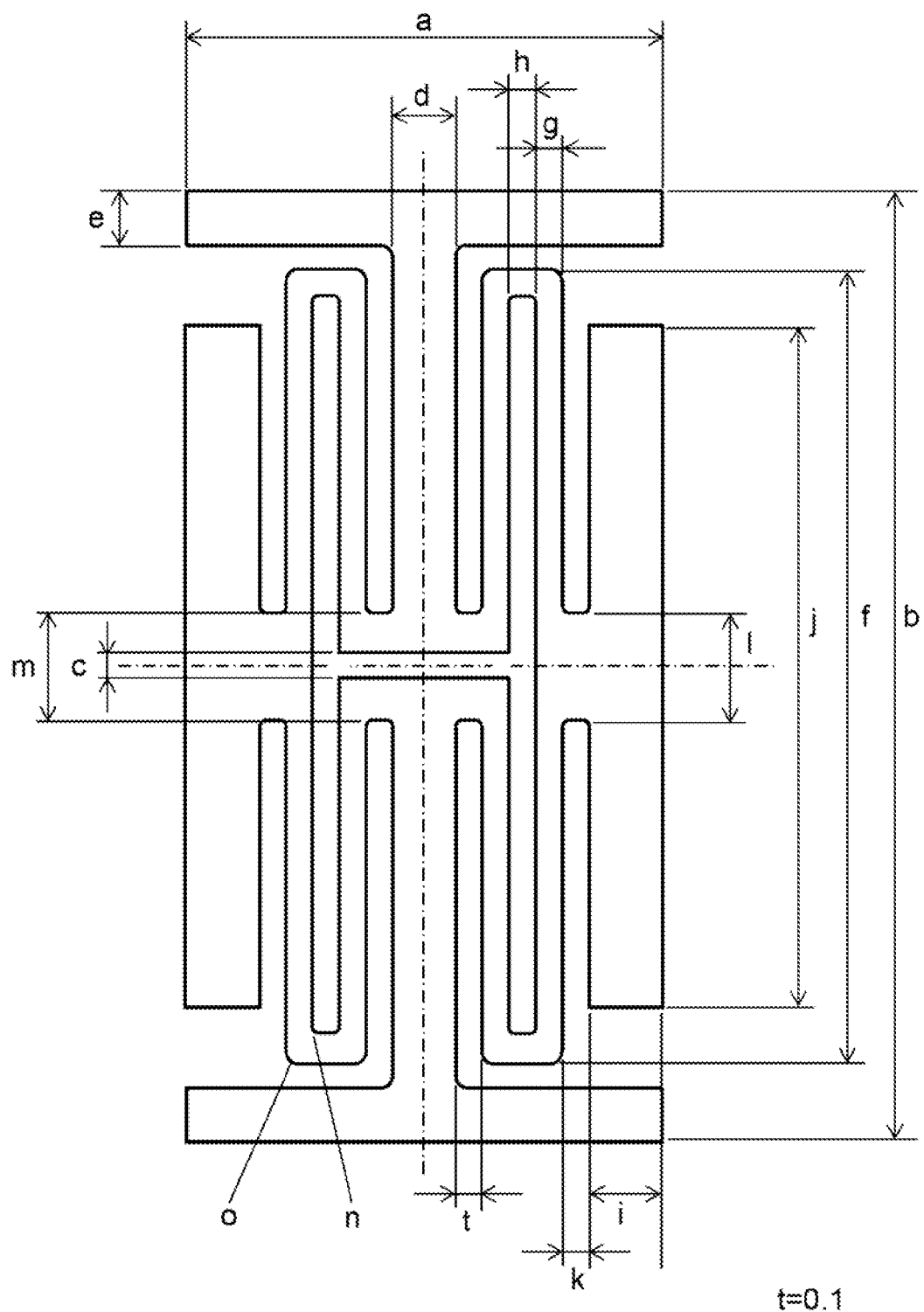
FIG. 9 shows the shape and the size of the angular velocity sensor element in accordance with the first exemplary embodiment of the present invention.

FIG. 9 shows the shape and the size of the angular velocity sensor element in accordance with the first exemplary embodiment of the present invention. In FIG. 9, Si-made substrate 17 of angular velocity sensor element 5 has thickness 't' of 0.1 mm, outermost width 'a' of 1.004 mm, and width 'b' of 2.2 mm. Separated at the center, holding section 9 has a T shape. Width 'c' at the separated center measures 0.055 mm, width 'd' measures 0.134 mm, and width 'e' measures 0.125 mm. In each of driving arms 11, length 'f' of dog-leg structure of arm 11a and arm 11b measures 1.84 mm, width 'g' measures 0.6 mm, and gap width 'h' measures 0.055 mm. Weighting section 10 has width I' of 0.15 mm and width 'j' of 1.58 mm. Gap width 'k' at the connected part of weighting section 10 and arm 11b measures 0.055 mm and width T measures 0.24 mm. Width 'm' at the connected part of arm 11a with holding section 9 measures 0.24 mm (including width 'c'). Each corner of the dog-leg structure of arm 11a and arm 11b has fillet geometry to protect the structure from breakage due to concentration of the stresses generated in vibration. Each corner has inner fillet radius 'n' of 0.02 mm and outer fillet radius 'o' of 0.04 mm.

Although angular velocity sensor element 5 described above has a structure where a laminated electrode having PZT is disposed on substrate 17 made of Si, it is not limited to. The angular velocity sensor element may be formed of a structure in which opposite electrodes are disposed on the opposing surfaces of substrate 17 made of a piezoelectric body such as crystal. The structure is also effective in increasing amplitude in the driving vibration and accordingly enhancing the detection level of the angular velocity sensor element.

Second Exemplary Embodiment

Hereinafter, the structure of an angular velocity sensor of the second exemplary embodiment will be described with reference to the accompanying drawings.

Figure 10:
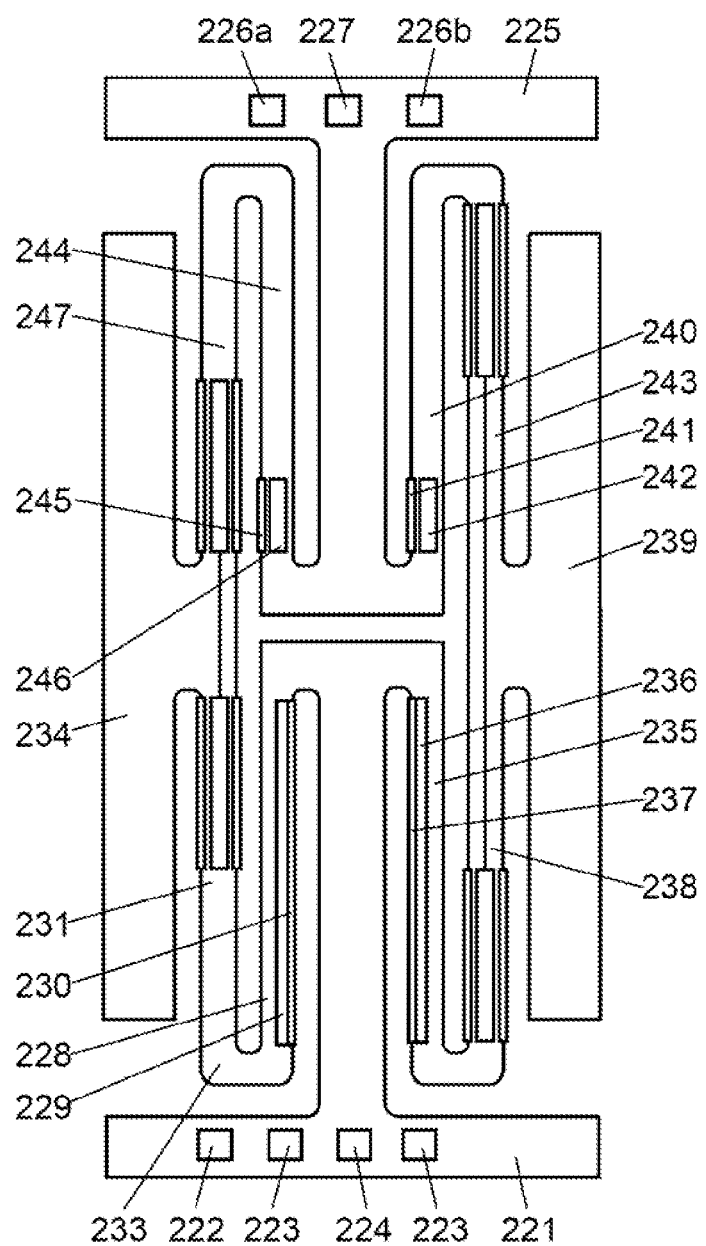
FIG. 10 is a top view showing an angular velocity sensor element in accordance with a second exemplary embodiment of the present invention.
Figure 11:
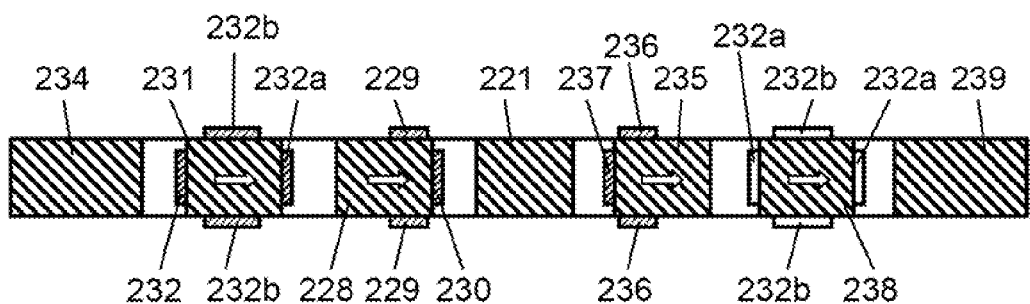
FIG. 11 is a sectional view showing a detecting electrode vibrating body and a driving electrode vibrating body of the angular velocity sensor element in accordance with the second exemplary embodiment of the present invention.
Figure 12:
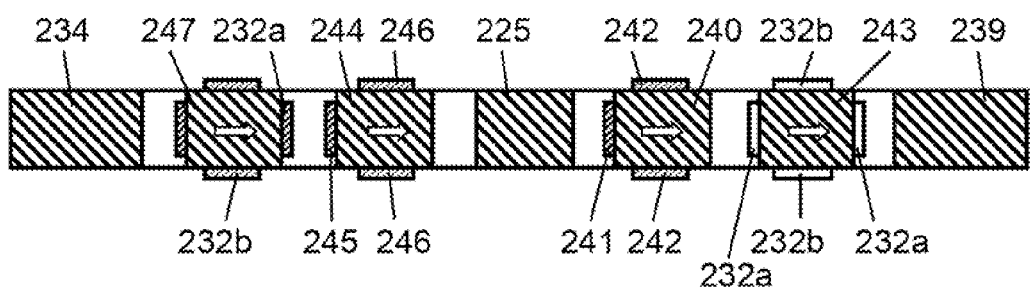
FIG. 12 is a sectional view showing the detecting electrode vibrating body and a monitoring electrode vibrating body of the angular velocity sensor element in accordance with the second exemplary embodiment of the present invention.

FIG. 10 is a top view showing an angular velocity sensor element in accordance with the second exemplary embodiment of the present invention. FIG. 11 is a sectional view showing a detecting electrode vibrating body and a driving electrode vibrating body of the angular velocity sensor element in accordance with the second exemplary embodiment of the present invention. FIG. 12 is a sectional view showing the detecting electrode vibrating body and a monitoring electrode vibrating body of the angular velocity sensor element in accordance with the second exemplary embodiment of the present invention.

In FIG. 10 through FIG. 12, the structure has first holding section 221 and second holding section 225, which are made of crystal and formed into a T shape. They are located on the same level. On the top surface of holding section 221, driving-electrode land 222, a pair of detecting-electrode lands 223, and GND-electrode land 224 are disposed. On the top surface of second holding section 225, a pair of driving-electrode lands 226a, monitoring-electrode land 226b, and GND-electrode land 227 are disposed.

As described above, first holding section 221 has detecting-electrode lands 223 and driving-electrode land 222. Detecting-electrode lands 223 are electrically connected to first detecting electrode 229 of first detecting electrode vibrating body 228 and second detecting electrode 236 of second detecting electrode vibrating body 235. Driving-electrode land 222 is electrically connected to first driving electrode 232a of first driving electrode vibrating body 231 and second driving electrode 232b of second driving electrode vibrating body 238. Besides, driving-electrode land 226a disposed on second holding section 225 is electrically connected to first driving electrode 232a of third driving electrode vibrating body 243 and second driving electrode 232b of fourth driving electrode vibrating body 247. With the structure above, the angular velocity sensor element communicates with an external circuit (not shown) with ease.

First detecting electrode vibrating body 228 is made of crystal. One end of vibrating body 228 is connected to first holding section 221 and the other end is connected to first driving electrode vibrating body 231. As shown in FIG. 11, vibrating body 228 has first detecting electrode 229 on an edge side of the top surface and GND electrode 230 on a side surface. First driving electrode vibrating body 231 is made of crystal. One end of vibrating body 231 is connected to first detecting electrode vibrating body 228 and the other end is connected to first weighting section 234. First driving electrode vibrating body 231 has a pair of first driving electrodes 232a on the both side surfaces and has a pair of second electrodes 232b on the top and the bottom surfaces. Dog-leg bend 233 connects first detecting electrode vibrating body 228 with first driving electrode vibrating body 231. Employing dog-leg bend 233 allows vibrating bodies 228 and 231 to have a similar deflection.

First weighting section 234 is connected to first driving electrode vibrating body 231. Second detecting electrode vibrating body 235 is made of crystal. One end of vibrating body 235 is connected to first holding section 221 on the side opposite to that having first detecting electrode vibrating body 228, and the other end of vibrating body 235 is connected to an end of second driving electrode vibrating body 238. As shown in FIG. 11, second detecting electrode vibrating body 235 has second detecting electrode 236 on an edge side of the top surface and GND electrode 237 on a side surface. Second driving electrode vibrating body 238 is made of crystal. One end of vibrating body 238 is connected to second detecting electrode vibrating body 235, and the other end of vibrating body 238 is connected to second weighting section 239. Second driving electrode vibrating body 238 has a pair of first driving electrodes 232a on the both side surfaces and has a pair of second electrodes 232b on the top and the bottom surfaces.

First monitoring electrode vibrating body 240 is made of crystal. One end of vibrating body 240 is connected to second holding section 225, and the other end of vibrating body 240 is connected to third driving electrode vibrating body 243. As shown in FIG. 12, vibrating body 240 has first monitoring electrode 241 on a side surface and a pair of GND electrodes 242 on the top and the bottom surfaces. Third driving electrode vibrating body 243 is made of crystal. One end of vibrating body 243 is connected to first monitoring electrode vibrating body 240, and the other end of vibrating body 243 is connected to second weighting section 239. Vibrating body 243 has a pair of first driving electrodes 232a on the both side surfaces and a pair of second driving electrodes 232b on the top and the bottom surfaces. Second monitoring electrode vibrating body 244 is made of crystal. One end of vibrating body 244 is connected to second holding section 225, and the other end of vibrating body 244 is connected to fourth driving electrode vibrating body 247. As shown in FIG. 12, vibrating body 244 has second monitoring electrode 245 on a side surface and a pair of GND electrodes 246 on the top and the bottom surfaces. Fourth driving electrode vibrating body 247 is made of crystal. One end of vibrating body 247 is connected to second monitoring electrode vibrating body 244, and the other end of vibrating body 247 is connected to first weighting section 234. Vibrating body 247 has a pair of first driving electrodes 232a on the both side surfaces and a pair of second driving electrodes 232b on the top and the bottom surfaces. Each of first driving electrode vibrating body 231, second driving electrode vibrating body 238, third driving electrode vibrating body 243, and fourth driving electrode vibrating body 247 is polarized with respect to a pair of first driving electrode vibrating body 231 respectively disposed thereon.

Such structured angular velocity sensor of the embodiment is assembled by the following processes:

Preparing the substrate having an integral structure of the following components forming the angular velocity sensor element: first holding section 221, first detecting electrode vibrating body 228, first driving electrode vibrating body 231, first weighting section 234, second detecting electrode vibrating body 235, second driving electrode vibrating body 238, second weighting section 239, third driving electrode vibrating body 243, first monitoring electrode vibrating body 240, second holding section 225, second monitoring electrode vibrating body 244, and fourth driving electrode vibrating body 247.

Forming first driving electrode 232a and second driving electrode 232b on each of first driving electrode vibrating body 231, second driving electrode vibrating body 238, third driving electrode vibrating body 243, and fourth driving electrode vibrating body 247 by gold evaporation.

Forming first detecting electrode 229 and GND electrode 230 on first detecting electrode vibrating body 228 by gold evaporation; similarly, forming second detecting electrode 236 and GND electrode 237 on second detecting electrode vibrating body 235 by gold evaporation.

Forming first monitoring electrode 241 and GND electrode 242 on first monitoring electrode vibrating body 240 by gold evaporation; similarly, forming second monitoring electrode 245 and GND electrode 246 on second monitoring electrode vibrating body 244 by gold evaporation.

Forming driving-electrode land 222, detecting-electrode land 223, and GND-electrode land 224 on first holding section 221 by gold evaporation; similarly, forming driving-electrode land 226a, monitoring-electrode land 226b, and GND-electrode land 227 on second holding section 225 by gold evaporation.

The angular velocity sensor element of the embodiment is thus assembled. Next, the workings of the angular velocity sensor element will be described.

Figure 13:
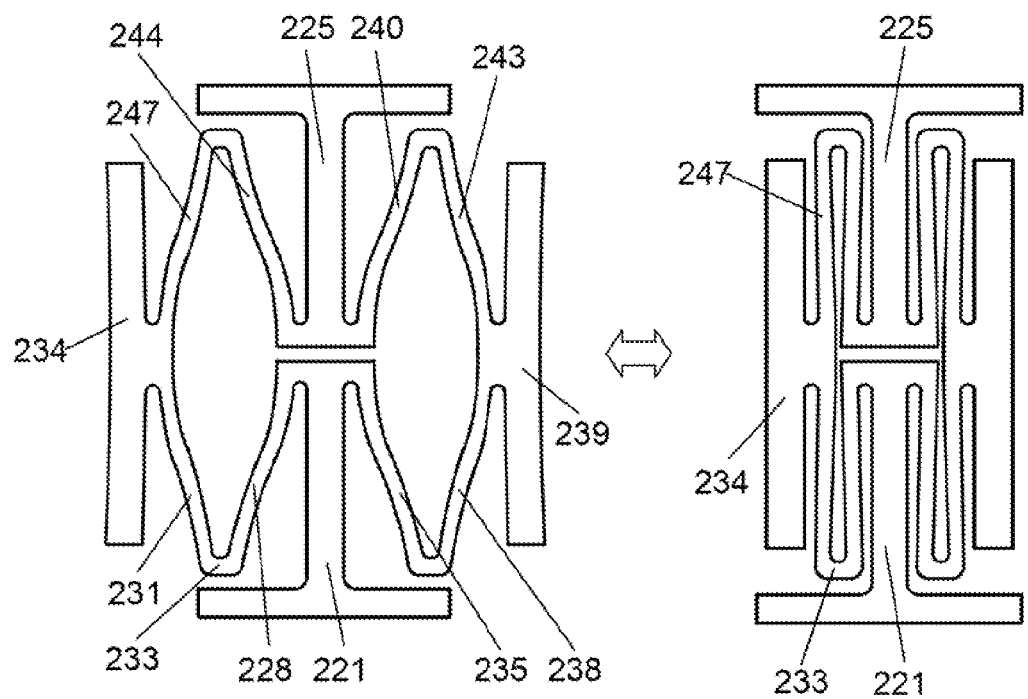
FIG. 13 is a top view showing the driving vibration state of the angular velocity sensor element in accordance with the second exemplary embodiment of the present invention.

FIG. 13 is a top view showing the driving vibration state of the angular velocity sensor element in accordance with the second exemplary embodiment of the present invention. When AC voltage is applied to first driving electrode 232a and second driving electrode 232b disposed on each of first driving electrode vibrating body 231, second driving electrode vibrating body 238, third driving electrode vibrating body 243, and fourth driving electrode vibrating body 247, electric current flows between first driving electrode 232a and second driving electrode 232b. When the current flows in a direction the same as the polarizing direction of vibrating bodies 231, 238, 243, and 247, a tensile stress occurs. Conversely, when the current flows in direction opposite to the polarizing direction of vibrating bodies 231, 238, 243, and 247, a compression stress occurs.

In response to the phase of AC voltage, as shown in FIG. 13, the angular velocity sensor element vibrates in the direction that connects first weighting section 234 and second weighting section 239 (i.e. in the driving direction) at velocity V. The driving vibration is transmitted to first detecting electrode vibrating body 228 and second detecting electrode vibrating body 225 via bend 233, by which vibrating bodies 228 and 235 vibrate in the driving direction with a natural vibration frequency of the driving direction at velocity V.

In the structure above, bend 233 is disposed not only between first detecting electrode vibrating body 228 and first driving electrode vibrating body 231, but also between second detecting electrode vibrating body 235 and second driving electrode vibrating body 238. In the driving vibration state, bend 233 works as a fulcrum point, allowing the four vibrating bodies above to have a large deflection. This increases the Coriolis force generated in first detecting electrode vibrating body 228 and second detecting electrode vibrating body 235, thereby increasing the level of output signals fed from first detecting electrode 229 of first detecting electrode vibrating body 228 and second detecting electrode 236 of second detecting electrode vibrating body 235. As a result, the angular velocity sensor element offers increased output sensitivity.

Figure 14:
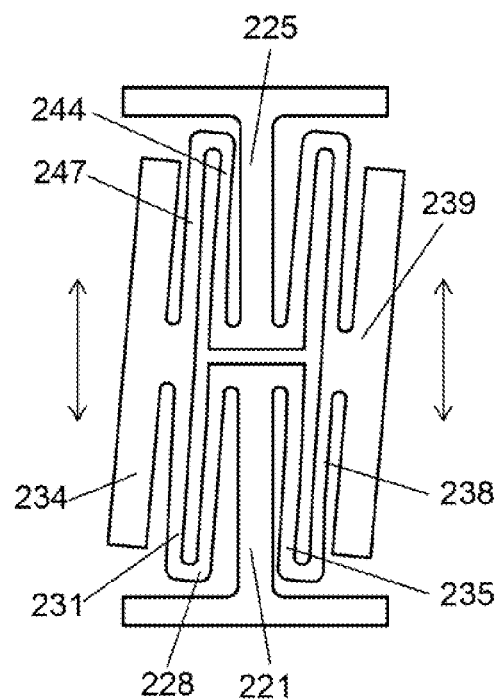
FIG. 14 is a top view showing a state where the Coriolis force generated in the angular velocity sensor element vibrates the sensor element in accordance with the second exemplary embodiment of the present invention.

FIG. 14 is a top view showing a state where the Coriolis force generated in the angular velocity sensor element vibrates the sensor element in accordance with the second exemplary embodiment of the present invention. Under the state in which first detecting electrode vibrating body 228 and second detecting electrode vibrating body 235 has driving vibration, when the angular velocity sensor element is rotated, at angular velocity ω, on a central axis that is perpendicular to the plane on which the angular velocity sensor element is disposed, first detecting electrode vibrating body 228 and second detecting electrode vibrating body 235 undergo Coriolis force F (=2 mv×ω). Under the Coriolis force, first detecting electrode 229 (of first detecting electrode vibrating body 228) and second detecting electrode 236 (of second detecting electrode vibrating body 235) output electric charge to the outside via a pair of detecting-electrode lands 223 disposed on first holding section 221. Angular velocity is thus detected.

According to the aforementioned structure of the embodiment, first detecting electrode vibrating body 228 and first driving electrode vibrating body 231 are connected by a joint section of a dog-leg shape. Similarly, second detecting electrode vibrating body 235 and second driving electrode vibrating body 238 are connected by a joint section of a dog-leg shape. By virtue of the structure, first detecting electrode vibrating body 228 and first driving electrode vibrating body 231 have a deflection of a similarity shape, and second detecting electrode vibrating body 235 and second driving electrode vibrating body 238 also have a deflection of a similarity shape. This allows the four vibrating bodies 228, 231, 235, and 238 to have stable vibration, enhancing accuracy of output signals generated by the Coriolis force.

Third Exemplary Embodiment

Hereinafter, an angular velocity sensor unit of the present invention will be described with reference to the accompanying drawings.

Figure 15:
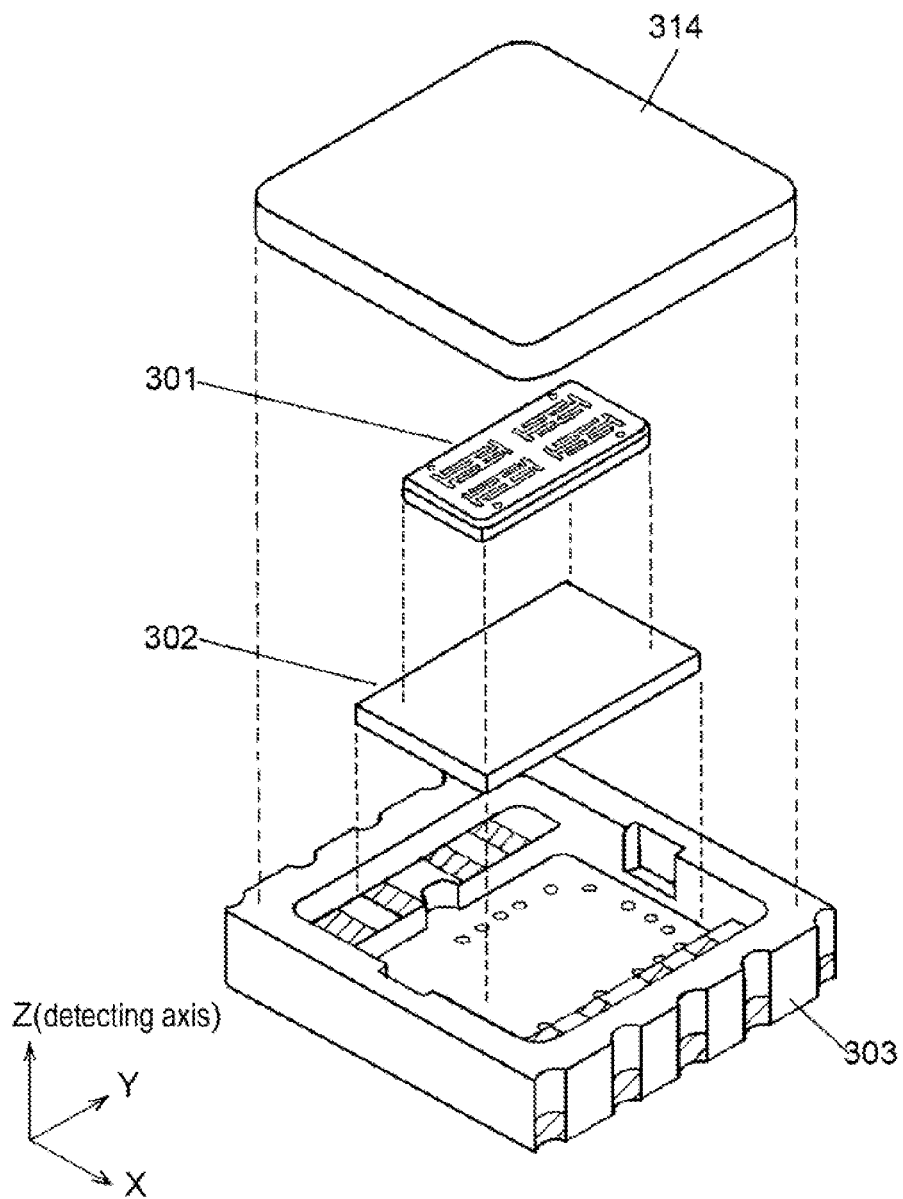
FIG. 15 is an exploded perspective view showing an angular velocity sensor unit in accordance with a third exemplary embodiment of the present invention.

FIG. 15 is an exploded perspective view showing an angular velocity sensor unit in accordance with the third exemplary embodiment of the present invention. In FIG. 15, package 303 contains vibration angular velocity sensor element 301 for detecting angular velocity and IC 302. IC 302 has a driving control circuit that applies a driving signal to angular velocity sensor element 301 and a detecting circuit that processes a detecting signal fed from sensor element 301. The opening of package 303 is covered with lid 314.

Figure 16:
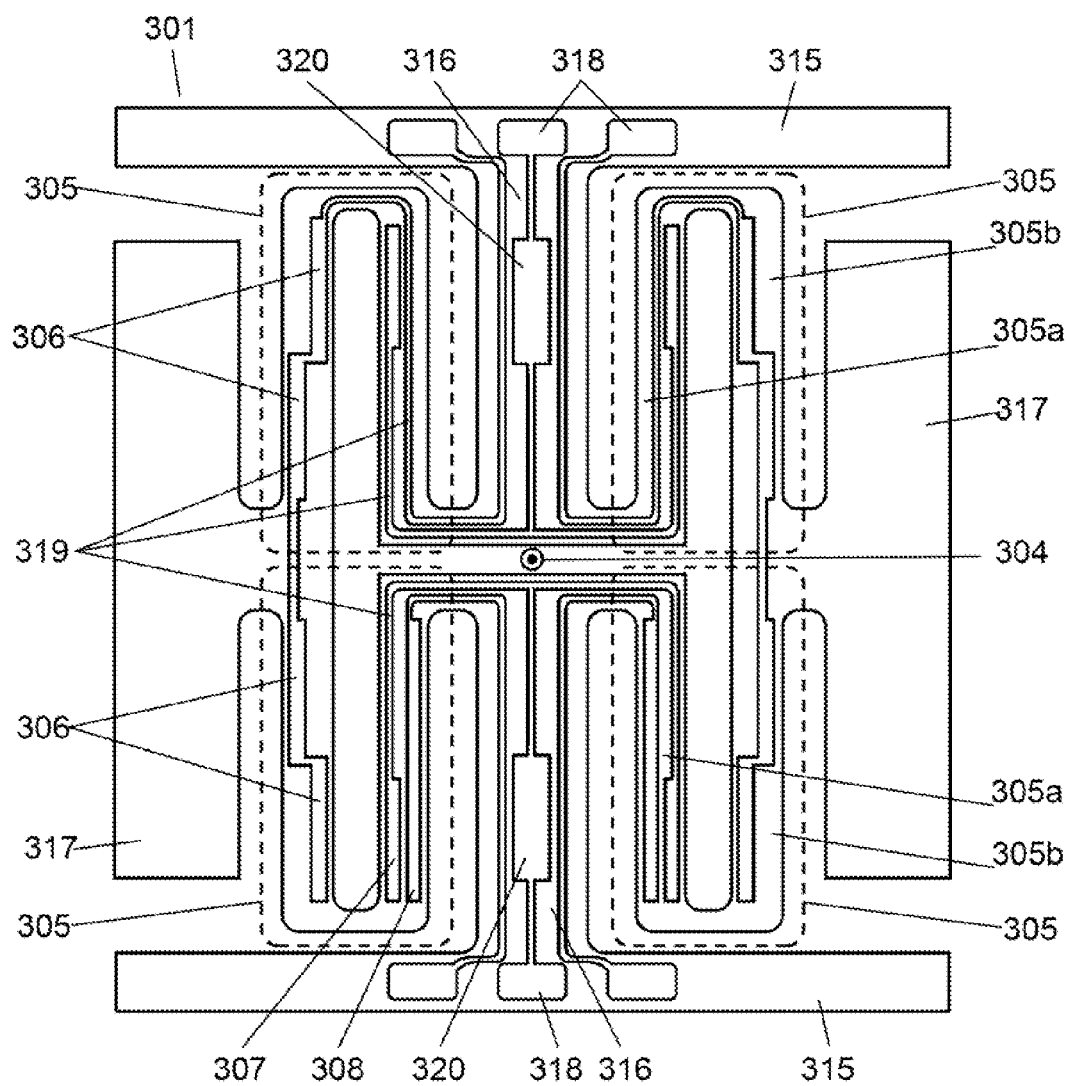
FIG. 16 is a top view showing the sensor element of the angular velocity sensor unit in accordance with the third exemplary embodiment of the present invention.

FIG. 16 is a top view showing the sensor element of the angular velocity sensor unit in accordance with the third exemplary embodiment of the present invention. In FIG. 16, sensor element 301 has external connection sections 315, supporting arms 316, weighting sections 317, and a pair of driving arms 305. Each of supporting arms 316 extends from the mid part of external connection section 315 toward the center of sensor element 301. Weighting sections 317 are symmetrically disposed on the both sides of supporting arms 316 and connected with a pair of driving arms 305. Driving arms 305 have driving electrode 306, sensing electrode 308, and monitoring electrode 307, which will be described later. The electrodes above are connected via wiring electrode 319 and electrode pad 318 disposed on external connection section 315. Each of driving arms 305 has a dog-leg structure of arm 305a and arm 305b extending in the Y-axis direction. Driving arm 305 connects between weighting section 317 and the tip of supporting arm 316.

Figure 17:
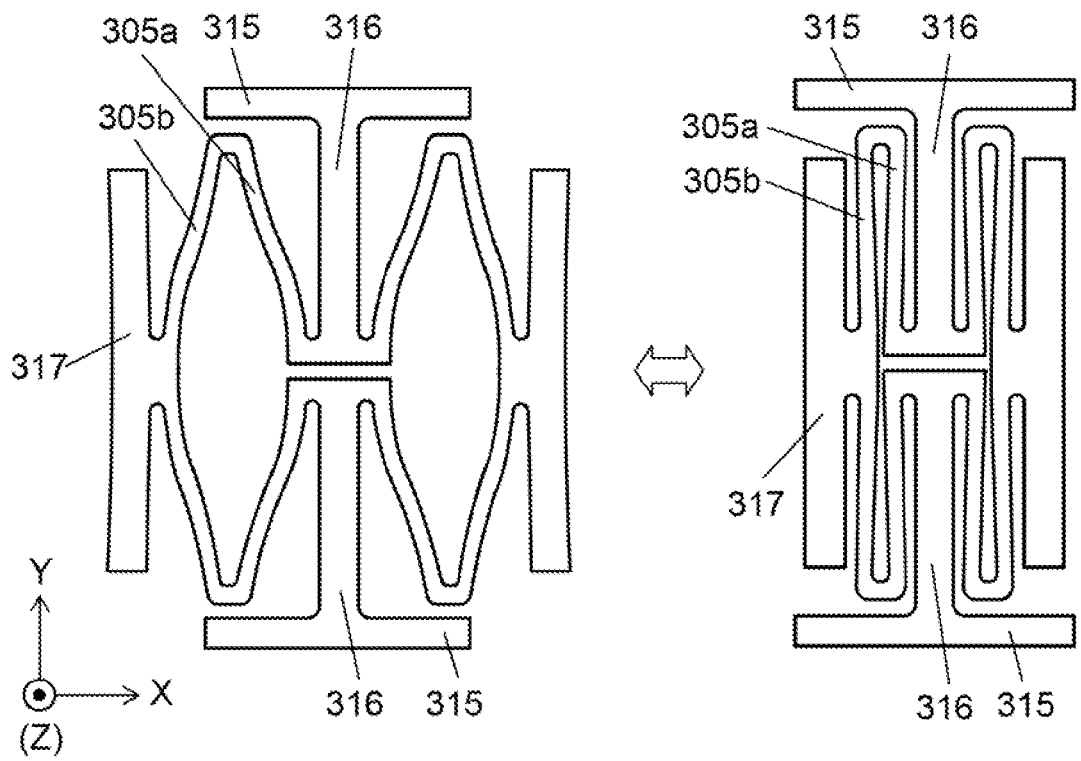
FIG. 17 schematically shows a fundamental vibration state of the sensor element of the angular velocity sensor unit in accordance with the third exemplary embodiment of the present invention.
Figure 18:
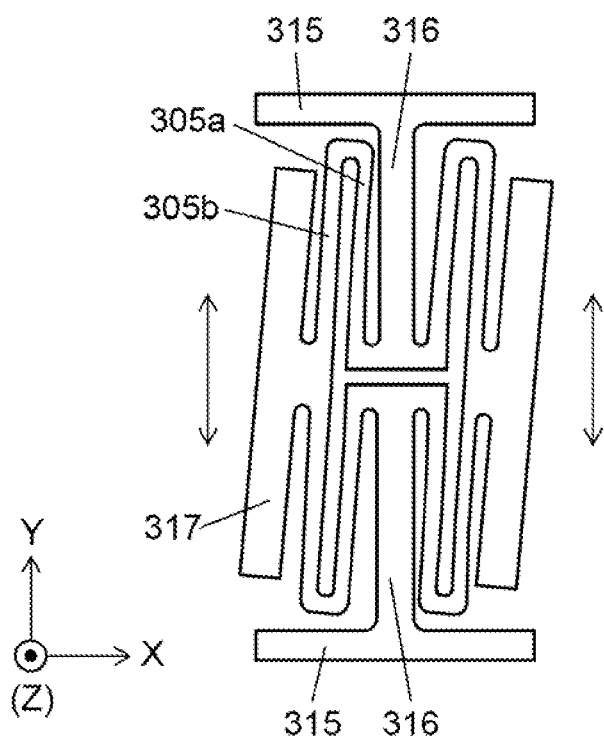
FIG. 18 schematically shows a detecting vibration state of the sensor element of the angular velocity sensor unit in accordance with the third exemplary embodiment of the present invention.

FIG. 17 schematically shows a fundamental vibration state of the sensor element of the angular velocity sensor unit in accordance with the third exemplary embodiment of the present invention. FIG. 18 schematically shows a detecting vibration state of the sensor element of the angular velocity sensor unit of the embodiment. A driving signal fed from IC 302 is applied, via electrode pad 318 and wiring electrode 319, to driving electrode 306. The application of driving signals allows weighting section 317 to have fundamental vibration with compression and extension in the X-axis direction, as shown in FIG. 17. In the fundamental vibration state, the angular velocity sensor element undergoes angular velocity with a rotation axis along the Z-axis direction, by which the Coriolis force is produced. The Coriolis force allows driving arms 305 to vibrate in the Y-axis direction, as shown in FIG. 18. Sensing electrode 308 detects a deflection of driving arms 305 caused by the vibration in the Y-axis direction, and converts it into an electric signal as a detecting signal. The detecting signal is transmitted to IC 302 via wiring electrode 319 and electrode pads 318. Monitoring electrode 307 controls driving signals; specifically, it detects vibration amplitude and a driving cycle of driving arms 305 in vibration and feeds the information back to IC 302.

Sensor element 301 has driving electrode 306, sensing electrode 308, and monitoring electrode 307 on the substrate made of Si. As is described in FIG. 26, each of the electrodes has a laminated structure formed of Pt-made lower electrode 3011 disposed on the substrate, PZT-made piezoelectric layer 3009 disposed on lower electrode 3011, and Au-made upper electrode 3010 disposed on piezoelectric layer 3009. When a positive voltage is applied to upper electrode 3010 while lower electrode 3011 is being grounded, compression force 3012 is exerted on the structure in the laminated direction, by which the laminated structure has an extension. When a negative voltage is applied to upper electrode 3010, tensile force 3013 is exerted on the structure in the laminated direction, by which the laminated structure has a compression. Conversely, providing driving arms 305 with deflection can produce voltage. That is, a negative voltage is obtained by exerting a compression force on the electrode, whereas a positive voltage is obtained by exerting a tensile force on the electrode.

Figure 19:
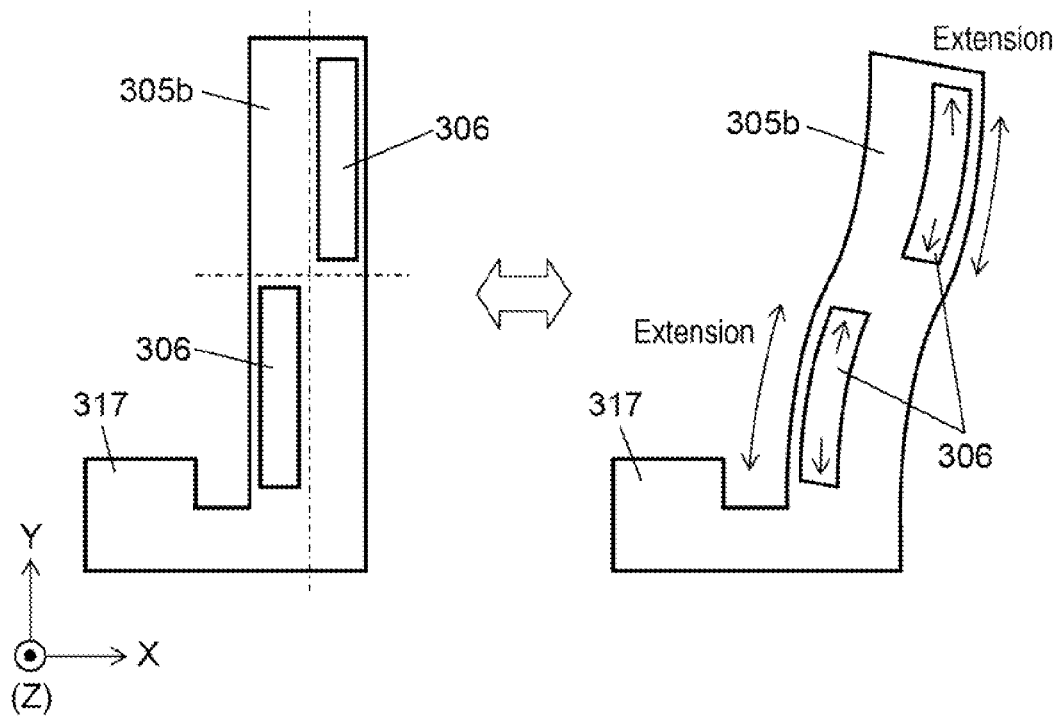
FIG. 19 schematically shows the working state of a driving electrode to provide fundamental vibration of the sensor element of the angular velocity sensor unit in accordance with the third exemplary embodiment of the present invention.

FIG. 19 schematically shows the working state of a driving electrode to provide fundamental vibration of the sensor element of the angular velocity sensor unit in accordance with the third exemplary embodiment of the present invention. To attain the fundamental vibration of sensor element 301, driving electrodes 306 are positioned as follows. First, arm 305b disposed on the side of weighting section 317 is divided into four areas with respect to a changing point of deflection shown by dashed lines in FIG. 19. Driving electrodes 306 are disposed in an area close to weighting section 317 and in the area diagonal to above. When a positive voltage is applied to the diagonally disposed driving electrodes 306, a compression force is exerted on the electrodes, allowing the electrodes to have extension. As a result, arm 305b has a deflection of an S shape. When a negative voltage is applied to the electrodes, a tensile force is exerted on the electrodes, allowing the electrodes to have compression. As a result, arm 305b has a deflection of an inverted S shape. Repeating the application of voltage allows weighting section 317 to have driving vibration in the X-axis direction.

Figure 20:
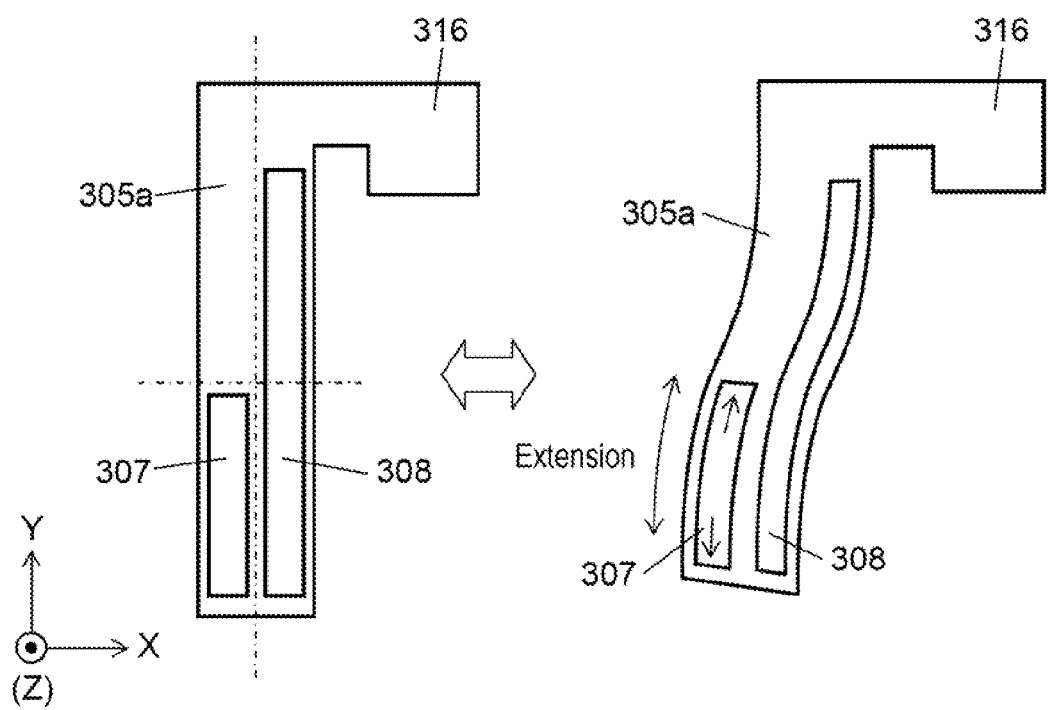
FIG. 20 schematically shows a detecting state in which a monitoring electrode detects the fundamental vibration of the sensor element of the angular velocity sensor unit in accordance with the third exemplary embodiment of the present invention.

FIG. 20 schematically shows a detecting state in which a monitoring electrode detects the fundamental vibration of the sensor element of the angular velocity sensor unit in accordance with the third exemplary embodiment of the present invention. In the fundamental vibration, arm 305a has a changing point shown by dashed lines at which the direction of deflection is oppositely changed. Monitoring electrode 307 should be disposed in an area of the four areas so as not to extend across the dashed lines. Such positioned monitoring electrode 307 produces voltage corresponding to the deflection of arm 305a and forms a monitoring signal.

Figure 21:
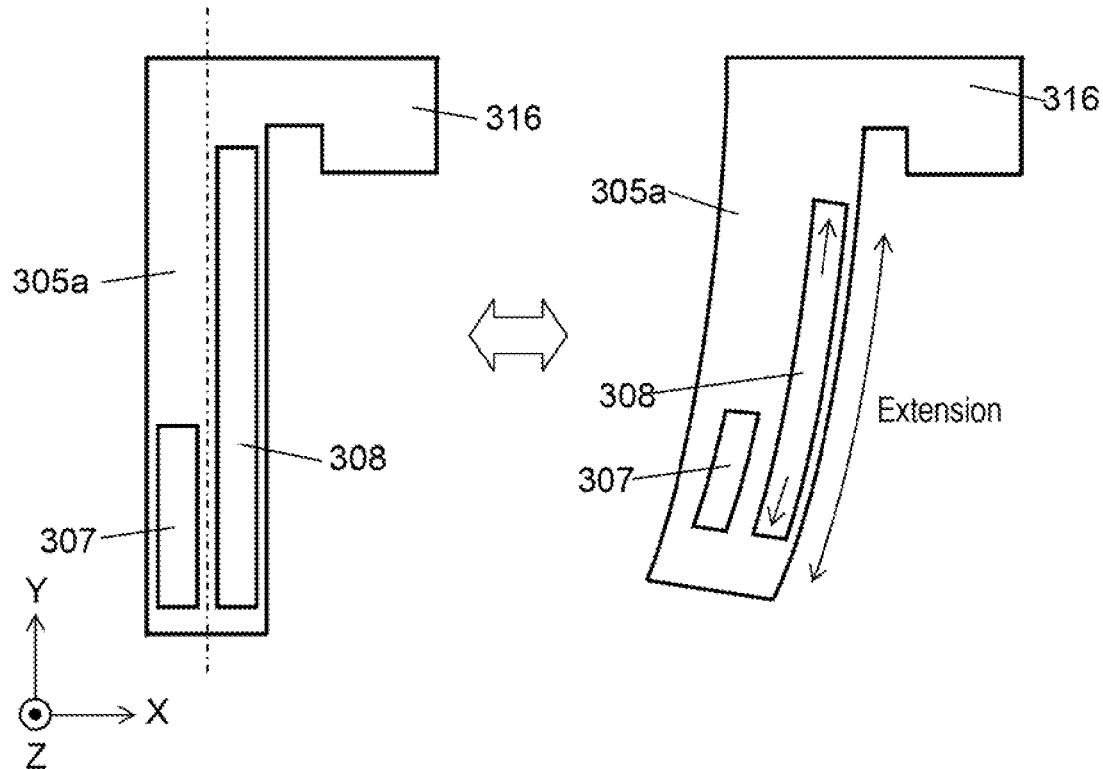
FIG. 21 schematically shows a detecting state in which a sensing electrode detects detecting vibration of the sensor element of the angular velocity sensor unit in accordance with the third exemplary embodiment of the present invention.

FIG. 21 schematically shows a detecting state in which a sensing electrode detects a driving vibration of the sensor element of the angular velocity sensor unit in accordance with the third exemplary embodiment of the present invention. Under the Coriolis force, arm 305a is arched, as shown in FIG. 21. Detecting the deflection of arm 305a, sensing electrode 308 generates a detecting signal corresponding to the deflection. As is shown in FIG. 21, sensing electrode 308 is disposed on arm 305a so as to be offset rightward from the central axis of arm 305a. When arm 305a has a leftward deflection as seen in FIG. 21, sensing electrode 308 disposed in the right half of arm 305a undergoes an extending force, producing a positive voltage. Conversely, when arm 305a has a rightward deflection as seen in FIG. 21, sensing electrode 308 undergoes a compressing force, producing a negative voltage. Sensing electrode 308 thus produces a detecting signal.

To detect angular velocity by the angular velocity sensor unit, it is important that sensor element 301 has fundamental vibration in the X-Y plane. As is described in FIG. 26, driving electrode 306 has a laminated structure of upper electrode 3010, lower electrode 3011, and piezoelectric layer 3009.

In the structure above, the fundamental vibration of driving arms 305 in the X-axis direction is obtained by compression and extension of driving electrode 306. However, at the same time, compression force 3012 and tensile force 3013 are exerted on driving electrode 306 in the laminated direction i.e. in the Z-axis direction. The Z-axis vibration has an adversely effect on monitoring electrode 307 that detects fundamental vibration of driving arms 305. That is, an unwanted signal formed by the Z-axis vibration is mixed into the detecting signal fed from monitoring electrode 307, which has degraded detecting accuracy of the angular velocity sensor unit.

In the angular velocity sensor unit of the embodiment, to address the problem above, correction electrode 320 is disposed on supporting arm 316 at wiring electrode 319 that connects between electrode pad 318 and monitoring electrode 307. Detecting the Z-axis vibration, correction electrode 320 forms a correction signal so as to attenuate the unwanted signal formed in monitoring electrode 307 due to the Z-axis vibration. The structure suppresses the effect on monitoring electrode 307 due to the Z-axis vibration.

For reliably attenuating an unwanted signal caused by the Z-axis vibration, what required for monitoring electrode 320 is—not forming a signal in response to fundamental vibration, but forming a signal with a potential opposite to the unwanted signal generated in monitoring electrode 307 in the Z-axis vibration. That is, correction electrode 320 should be located on a part having less effect of fundamental vibration and having deflection in a direction opposite to deflection that monitoring electrode 307 undergoes in the Z-axis vibration. Specifically, monitoring electrode 307 is disposed on arm 305a on the side of external connection section 315. Correction electrode 320 is disposed on supporting arm 316—which is the axis of symmetry of fundamental vibration and therefore is insusceptible to the vibration—on the side of external connection section 315.

Figure 22:
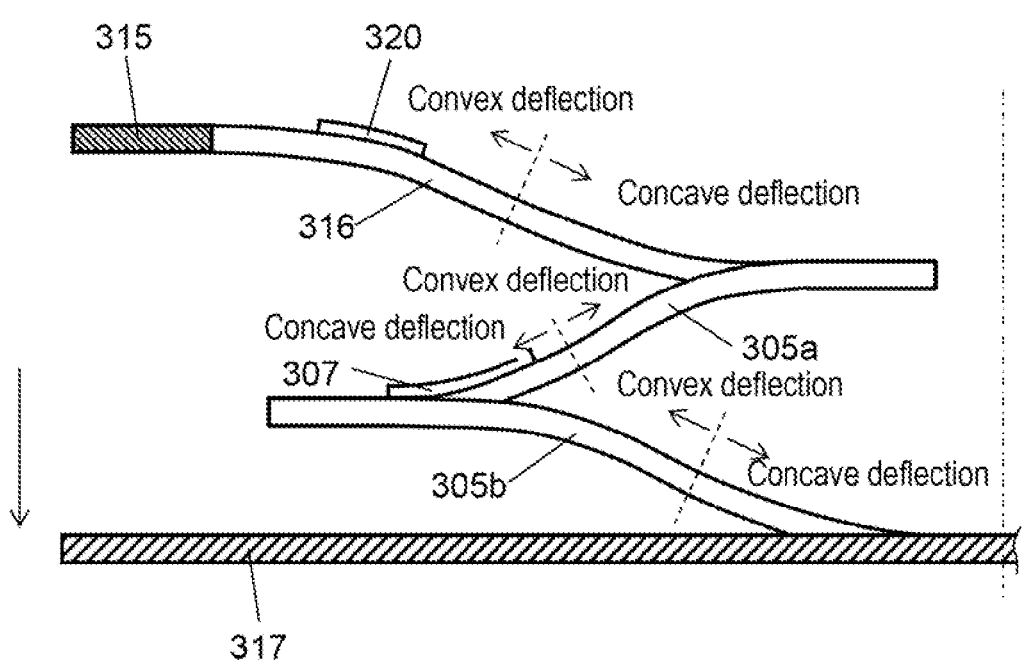
FIG. 22 schematically shows Z-axis vibration of the sensor element of the angular velocity sensor unit in accordance with the third exemplary embodiment of the present invention.

FIG. 22 schematically shows a Z-axis vibration of the sensor element of the angular velocity sensor unit in accordance with the third exemplary embodiment of the present invention. When weighting section 317 moves downward in the Z-axis vibration, arm 305a has a concave deflection at the part on which monitoring electrode 307 is disposed. At that time, monitoring electrode 307 undergoes a compression force, thereby producing a negative voltage. On the other hand, the part on which correction electrode 320 is disposed of supporting arm 316 has a convex deflection. At that time, correction electrode 320 undergoes a tensile force, thereby producing a positive voltage.

An unwanted signal generated in monitoring electrode 307 and a correction signal generated in correction electrode 320, both of which are caused by the Z-axis vibration, are opposite in potential. These signals are transmitted to same electrode pad 318 via wiring electrode 319, as shown in FIG. 16. In this way, electrode pad 318 outputs monitoring signals from which an unwanted signal caused by the Z-axis vibration has been attenuated by a correction signal.

In the Z-axis vibration, an unwanted signal is formed not only in monitoring electrode 307 but also in wiring electrode 319. Employing an improved electrode design capable of attenuating both the unwanted signals by the correction signal from correction electrode 320 enhances detection accuracy of the angular velocity sensor unit.

According to sensor element 301, as described above, correction electrode 320 produces a correction signal to attenuate an unwanted signal generated in monitoring electrode 307 in the Z-axis vibration, without producing a signal in response to the fundamental vibration. By virtue of the proper attenuation, the monitoring signal fed from sensor element 301 to IC 302 has high detection accuracy. That is, the fundamental vibration of sensor element 301 is controlled by the monitoring signal with high detection accuracy, which contributes to enhanced detection accuracy of the angular velocity sensor unit.

By virtue of the structure that suppresses an unwanted signal generated in the Z-axis vibration, TAB tape or other anti-vibration measures against unwanted flexural vibration in the Z-axis direction can be eliminated when sensor element 301 is disposed in package 303.

The present invention provides an angular velocity sensor with enhanced detection level. The angular velocity sensor element of the present invention offers high output sensitivity. Further, the present invention provides an angular velocity sensor unit with enhanced detection accuracy. These advantages are particularly useful for the angular velocity sensor used in electronic equipment that has to meet the needs of having high sensitivity in a compact body, such as a navigation system device.

The invention claimed is:

1. An angular velocity sensor element comprising:
a driving arm having a first end and a second end opposite to the first end;
a holding section connected to the first end of the driving arm;
a weighting section connected to the second end of the driving arm;
a driving electrode that is disposed on the driving arm and configured to vibrate the weighting section; and
a detecting electrode that is disposed on the driving arm and is configured to detect angular velocity of the driving arm,
wherein, the driving arm is disposed between the holding section and the weighting section,
a length of the driving arm in a first direction from the first end to the second end is shorter than a length of the driving arm in a second direction substantially perpendicular to the first direction, and
the driving arm is substantially surrounded on at least three sides by the holding section and the weighting section.

2. The angular velocity sensor element of claim 1, wherein the driving arm has arm members extending in the second direction, and
the detecting electrode is disposed on one arm member of the arm members so as to be offset from a central axis of the one arm member in an extending direction.

3. The angular velocity sensor element of claim 2, wherein the detecting electrode has a symmetrical shape in the extending direction of the arm members with respect to a changing point of deflection of the arm members.

4. The angular velocity sensor element of claim 1, wherein the driving arm is composed of a first driving arm and a second driving arm,
the first driving arm has first and second arm members extending in the second direction,
the holding section is disposed between the first driving arm and the second driving arm, and, the driving electrode is disposed on the first arm member and the detecting electrode is disposed on the second arm member, and the driving electrode is disposed so as to be offset from a central axis of the first arm member in an extending direction.

5. The angular velocity sensor element of claim 4, wherein the driving electrode is divided into two sections and the first arm member is divided into four areas on a vertical axis parallel to the second direction and on a horizontal axis parallel to the first direction of the first arm member, and the divided sections of the driving electrode are disposed in diagonal areas of the four areas.

6. An angular velocity sensor comprising:
an angular velocity sensor element of claim 1;
a driving control circuit that applies a driving signal to a driving electrode disposed on the angular velocity sensor element; and
a detecting circuit that processes a detecting signal fed from a detecting electrode disposed on the angular velocity sensor element.

7. The angular velocity sensor element of claim 1, wherein the driving arm has a dog-leg structure of arm members extending in a direction perpendicular to a vibrating direction of the weighting section.

8. The angular velocity sensor element of claim 7, wherein each corner of the dog-leg structure of the arm members has fillet geometry.

9. The angular velocity sensor element of claim 1, wherein the driving electrode has a lower electrode, piezoelectric substrate, and an upper electrode stacked in this order.

10. The angular velocity sensor element of claim 1, wherein
the driving arm has an air gap disposed between the first end of driving arm and the second end of the driving arm.

11. The angular velocity sensor element of claim 1, wherein
the holding section is separated into two portions at a center of the holding section.

12. The angular velocity sensor element of claim 1, wherein
the first end of the driving arm is connected to the holding section at a center of the holding section in the second direction substantially perpendicular to the first direction from the first end to the second end.

13. The angular velocity sensor element of claim 1, wherein
the driving arm has a first driving arm and a second driving arm,
the holding section is disposed between the first driving arm and the second driving arm, and
a length between the first driving arm and the second driving arm in the first direction is shorter than a length of the driving arm in the second direction.

14. An angular velocity sensor element comprising:
a driving arm having a first end and a second end opposite to the first end;
a holding section connected to the first end of the driving arm;
a weighting section connected to the second end of the driving arm;
a driving electrode disposed on the driving arm and being configured to vibrate the weighting section; and
a detecting electrode disposed on the driving arm and configured to detect angular velocity of the driving arm,
wherein, the driving arm has a first driving arm and a second driving arm,
the holding section is disposed between the first driving arm and the second driving arm, and
a length of the driving arm in a first direction from the first end to the second end is shorter than a length of the driving arm in a second direction substantially perpendicular to the first direction,
a length between the first driving arm and the second driving arm in the first direction is shorter than a length of the driving arm in the second direction, and
the driving arm is substantially surrounded on at least three sides by the holding section and the weighting section.

15. The angular velocity sensor element of claim 14, wherein
the driving electrode has a lower electrode, piezoelectric substrate, and an upper electrode stacked in this order.

16. The angular velocity sensor element of claim 14, wherein
the holding section is separated into two portions at a center of the holding section.

17. The angular velocity sensor element of claim 14, wherein
the first end of the driving arm is connected to the holding section at a center of the holding section in the direction substantially perpendicular to the direction from the first end to the second end.

18. The angular velocity sensor element of claim 14, wherein
each of the first driving arm and the second driving arm has arm members extending in the second direction, and
the detecting electrode is disposed on one arm member of the arm members so as to be offset from a central axis of the one arm member in the second direction.

19. The angular velocity sensor element of claim 14, wherein
each of the first driving arm and the second driving arm has arm members extending in the second direction, and
the detecting electrode has a symmetrical shape in the second direction with respect to a changing point of deflection of the arm member.

20. The angular velocity sensor element of claim 1, wherein the driving arm has a first driving arm and a second driving arm,
the holding section is disposed between the first driving arm and the second driving arm,
a shape of the first driving arm is symmetric to a shape of the second driving arm with respect to the holding section.

21. The angular velocity sensor element of claim 20, wherein the holding section is separated into two portions at a center of the holding section.

* * * * *